United States Patent
Ulery et al.

(10) Patent No.: US 7,036,118 B1
(45) Date of Patent: Apr. 25, 2006

(54) SYSTEM FOR EXECUTING COMPUTER PROGRAMS ON A LIMITED-MEMORY COMPUTING MACHINE

(75) Inventors: James Ulery, Anaheim Hills, CA (US); Nour Toukmaji, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 535 days.

(21) Appl. No.: 10/029,516

(22) Filed: Dec. 20, 2001

(51) Int. Cl.
*G06F 9/45* (2006.01)

(52) U.S. Cl. ..................................... 717/159
(58) Field of Classification Search ......... 717/140–161
See application file for complete search history.

(56) References Cited

U.S. PATENT DOCUMENTS

| | | | | |
|---|---|---|---|---|
| 5,212,794 A | * | 5/1993 | Pettis et al. | 717/153 |
| 5,530,964 A | * | 6/1996 | Alpert et al. | 717/158 |
| 5,752,038 A | * | 5/1998 | Blake et al. | 717/158 |
| 5,889,996 A | * | 3/1999 | Adams | 717/139 |
| 5,937,191 A | * | 8/1999 | Graham | 717/130 |
| 6,029,004 A | * | 2/2000 | Bortnikov et al. | 717/158 |
| 6,115,809 A | * | 9/2000 | Mattson et al. | 712/239 |
| 6,292,934 B1 | * | 9/2001 | Davidson et al. | 717/158 |
| 6,301,652 B1 | * | 10/2001 | Prosser et al. | 712/204 |
| 6,631,518 B1 | * | 10/2003 | Bortnikov et al. | 717/158 |
| 6,634,023 B1 | * | 10/2003 | Komatsu et al. | 717/159 |
| 2003/0088860 A1 | * | 5/2003 | Wang | 717/153 |

OTHER PUBLICATIONS

Elana D. Granston & Harry A. G. Wijshoff, Managing Pages in Shared Virtual Memory Systems: Getting the Compiler into the Game, 1993, ACM Press.*

* cited by examiner

*Primary Examiner*—Kakali Chaki
*Assistant Examiner*—Trenton J Roche
(74) *Attorney, Agent, or Firm*—Christopher J. Rourk; Godwin Pappas Langley Ronquillo LLP

(57) ABSTRACT

A system for executing computer programs on a target platform having a limited amount of memory. Directives are suitably placed in the computer program source code at natural boundaries. The system uses the directives to extract structural information from the computer program and to produce a description of all program objects; to estimate typical object usage; and, to trigger transparent object paging to and from the limited platform memory during execution of the computer program. The system makes paging decisions prior to runtime by using relevant factors such as the typical usage of program objects and the size of each program object.

19 Claims, 17 Drawing Sheets

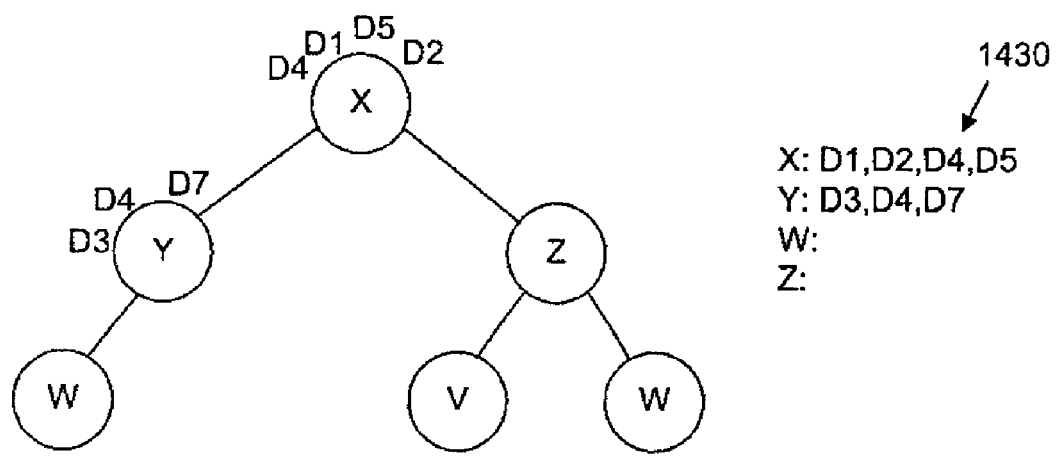
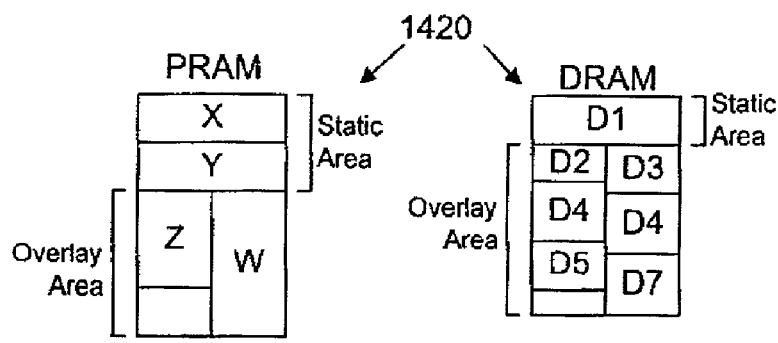
FIG. 14

SYSTEM FOR EXECUTING COMPUTER PROGRAMS ON A LIMITED-MEMORY COMPUTING MACHINE

BACKGROUND OF THE INVENTION

1. Technical Field

The present invention relates generally to the execution of computer programs on computing machines. More specifically, the present invention relates to a system for the execution of computer programs on computing machines that utilize a two-tier memory hierarchy comprised of a small, fast "local" memory for program execution and a larger, slower "bulk" memory for program storage.

2. Background Information

Hierarchical memory systems are a well-known solution to the problem of connecting increasingly fast Central Processing Units (CPUs) with increasingly large, slow bulk storage. One or more additional stages of memory, decreasing in size and increasing in speed as one approaches the CPU, are inserted between the CPU and bulk storage. Often, the intermediate memories are too small to contain the entire application at one time. Therefore, paging is used to transfer code and data blocks between adjacent memories in response to the flow of the executing program. The problem within this context is designing and implementing a paging mechanism that effectively incorporates several main design considerations including:

Partitioning the program into blocks
Uniquely identifying each block
Trigger mechanism whereby program execution results in block paging requests
Fast memory management policy for block placement and replacement Previous solutions to this paging problem generally fall into two categories: hardware caching (including the well-known virtual memory) and manual paging. Hardware caching is a well-known automatic mechanism that employs special-purpose hardware to monitor real-time memory access activity, detect cache misses, transfer fixed-size memory blocks (lines) between bulk memory and fast memory, and manage the placement and replacement of these lines within fast memory. The cache hardware design effectively partitions applications into fixed-size pieces, based on the application's location in bulk memory, without regard for the application's structure. The placement/replacement policy is typically fixed (e.g. Least Recently Used, N-way Set Associative, Random Replacement algorithms) and designed to offer acceptable performance over a class of applications rather than being tuned for a specific application. Adoption of a Hardware Caching solution negatively impacts hardware complexity and power dissipation and, for architectures with multiple, concurrently-accessible memories (such as the Harvard architecture, common to most digital signal processors), requires cache hardware for each memory subsystem.

In manual paging, a programmer manually examines an application's source code and design documentation to understand the various functions embedded within the application and to decipher the application's program structure. Then, with knowledge of the target platform's fast memory resources and architecture, the programmer manually partitions the application and builds in a custom paging mechanism. This paging mechanism is actively managed during run time by program instructions added to the application by the programmer to page the resulting partitions into and out of fast memory as needed in real-time or near real-time. Manual paging requires no special-purpose hardware, but relies heavily on the capabilities of the programmer. The need to understand the underlying application involves substantial effort, especially if the programmer incorporating the paging mechanism is not the application's original programmer. Introduction of a platform with further-reduced fast memory requires another manual paging effort, perhaps by a different programmer. As application complexity increases and fast memory sizes decrease, the ability to manually implement the paging process is negatively impacted by the number of partitions involved and by errors introduced by the programmer.

SUMMARY OF THE INVENTION

The present invention provides a system for solving the aforementioned problem and achieves an advance in the field by eliminating the need for special-purpose caching hardware while, at the same time, removing the dependence on time-consuming, error-prone, art-based manual paging. In accordance with one aspect of the present invention, platform-independent directives are embedded within the software application to partition the application into a number of interdependent binary images called 'program objects', which are paged transparently to and from fast memory as needed during execution of the application. The concept of 'program objects' in the context of the present invention is a novel concept which is not related to the term 'objects' in the well-known context of 'object-oriented programming'. The present invention defines a technology which transparently sequences the transfer of these objects between bulk memory and fast memory, thereby allowing execution of the application on the target platform.

The directives of the present invention are collectively referred to as 'ODE directives', where ODE denotes the 'Object Distribution and Execution' concept of the present invention. ODE directives serve the following unifying purposes within the system of the present invention:

They expose the application's structure
They enable estimation of object usage
They serve as paging 'triggers' within the executable In accordance with another aspect of the present invention, the application source code is first annotated by placing ODE directives within the application source code at intrinsic boundaries and at points of dependency. Such annotation can be performed manually (as with applications written in assembly language) or as part of an 'ODE aware' High Level Language (HLL) compiler. The directives identify boundaries in the source code which delineate program objects. The ODE directives also identify interconnections (i.e. dependencies) between the program objects.

Next, automated tools extract program structure from the annotated source code. The program structure includes object names, sizes, types, and dependencies.

The 'typical' usage of program objects during application execution is then estimated by the well-known procedure of stimulating the program with a set of typical test vector sequences and by counting object accesses as exposed by ODE directive occurrences.

Using the program structural and typical usage information, object allocation tools generate object placement rules that specify, a-priori, where objects will reside within fast memory at run time. Placement consists of designating objects as either static (resident for the duration of the application) or overlay (paged as needed) and fixing their locations in fast memory.

Next, automated tools port the application to the target platform by treating the ODE directives as an Application Programming Interface (API) and binding directive occurrences to the Object Management System (OMS) of the present invention. The OMS is a run-time mechanism that implements decisionless paging, driven by the application's placement rules, during execution of the application.

Finally, the resulting executable code and placement rules are merged into a binary application image that serves as the application's executable on the target platform.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIG. 14 illustrates an application structure, memory allocation map, and data dependency database;

DETAILED DESCRIPTION

The present invention may be described herein in terms of functional block components and processing steps. It should be appreciated that such functional blocks may be realized by any number of hardware components configured to perform the specified functions. In addition, those skilled in the art will appreciate that the present invention may be realized in a software or computer program context in conjunction with any number of conventional computer system environments. Furthermore, the present invention is not limited to the process flows described herein, as any process flow or rearrangement of process steps which captures the features of the present invention is considered to be within the scope of the present invention. It should be noted that the present invention may employ any number of conventional techniques for processing steps such as stimulating a computer program with a set of typical test vector sequences, and the like. Such general techniques that may be known to those skilled in the art are not described in detail herein.

It should be appreciated that the particular implementations and processes shown and described herein are illustrative of the present invention and its best mode and are not intended to otherwise limit the scope of the present invention in any way. For example, the names, types, and number of the various ODE directives may vary in different embodiments of the present invention and are not limited to those described herein.

Figure 1:
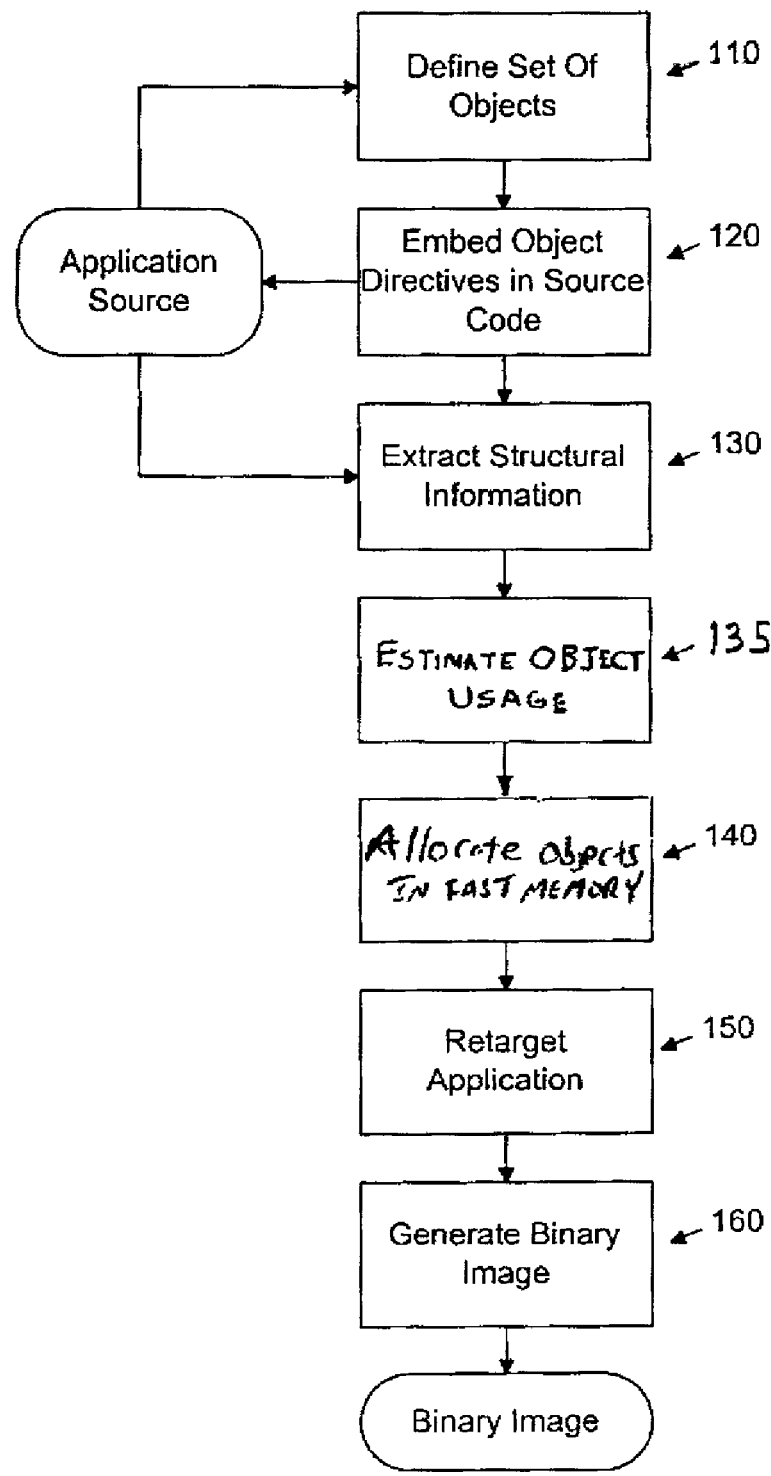
FIG. 1 is a flowchart illustrating, at a high level, the steps performed by the present method to port a software application to a limited memory target platform.

FIG. 1 is a flowchart illustrating, at a high level, the steps performed by the present method to port a software application program (hereinafter 'application') to a target platform having a limited amount of memory. FIG. 1 is used as a map throughout the present document for illustrating the relationship between the steps employed by the present method, and is thus supplemental to the description of the other drawings.

As shown in FIG. 1, a set of entities in the application source code, hereinafter referred to as 'program objects' (or simply 'objects'), is first defined at step 110. In accordance with the present invention, an application can be viewed as including sections which comprise executable code, constant data, and volatile (read/write) data. Each of these three entities, executable code, constant data, and volatile data, constitutes a class of objects, which may be termed 'CODE', 'CDATA', and 'VDATA', respectively.

At step 120, ODE directives that define program object partitions are placed in the application source code at 'natural boundaries'. ODE directives that express linkages between such partitions are placed at other locations in the source code, as explained below. ODE directives can be placed within the source code during the programming process, or can be added to an existing application without detailed knowledge of its inner workings.

With regard to application partitioning, the term 'natural boundaries' refers to boundaries between those entities which provide a conceptual basis for the structure of an application. For example, with regard to coding or analyzing an application, the application's structure may be conceptualized as comprising related entities such as functions and data structures; e.g., "function X calls functions Y and Z, and accesses data from tables T1 and T2." Thus, one natural partitioning approach is to define a program object as a complete function, a complete data table, etc, in accordance with the present method. These program objects then become indivisible atomic units of application program information, represented by their memory images. The method of the present invention moves these program objects between bulk memory and fast memory in their entirety as determined by their dependencies on one another in structure and time.

At step 130, program structural information, exposed by the ODE directives embedded in the application source code, is extracted directly from the application. This is done by processing the directive-annotated source through the Object Database Compiler, which produces the Object Database. The Object Database comprises a description of all program objects in the applications and the types of interactions between them.

At step 135, the 'typical' usage of program objects during application execution is estimated. The information gathered in this step provides the basis for the selection of objects for static residency.

At step 140, the program objects are assigned ('allocated') to fixed locations in target memory. The purpose of this phase is to determine, a priori, where to place (load) program objects in fast memory during run-time. Placement consists of designating objects as either static (bulk loaded and unloaded at the start and end of execution of an application frame) or overlay (loaded and possibly overwritten, as needed, during application execution) and fixing their locations in memory.

At step 150, the application is ported to a specific target platform. In this phase, an application's ODE exercise directives are bound to the target's Object Management System (OMS) mechanism, enabling transparent, decisionless, table-driven paging in real-time or near real-time. The OMS comprises the combination of platform-specific hardware and software that serves to control the movement of program objects as triggered by ODE directive occurrences during execution of the ODE-annotated application on the target platform.

Also at step 150, static/overlay assignment information is embedded within the ODE directive implementations, enabling direct reference to static objects. Further, a unique Overlay Selector integer is assigned to each overlay object in the application and embedded within the ODE directive implementations in the application executable. OMS uses the Overlay Selector at run time to index an array of data structures that govern each object's transfer between bulk and fast memories when triggered by application execution.

At step 160, an executable binary image (BIM) is generated as the load module. The binary image contains the executable code and object management data structures that enable decisionless table-driven object transfers during application execution on the target platform.

ODE Directives

At step 120, ODE directives are used to divide the application program source code into program objects according to natural application boundaries as identified in step 110. Additional directives are embedded into the application source code to indicate linkages between the program objects. Table 1 lists the ODE directives which may be employed when performing the method of the present invention.

TABLE 1

ODE Directives

BRANCH toObjectName - If CODE object toObjectName is not present in local memory, load it. Transfer control to toObjectName.
CALL objectName - If CODE object objectName is not present in local memory, load it. Transfer control to objectName.
CLOSE objectName - The specified object is no longer required and may be removed from memory. An object may be removed from memory only when no objects depend on it.
DEF_HANDLE objectName - Compile objectName's handle into current object.
ENDOBJ objectName - Marks the end of an object. objectName preferably is the same as the corresponding OBJ directive.
ENTRY objectName - Declares CODE object objectName as the entry point of the application.

TABLE 1-continued

ODE Directives

GET objectName, offset, container | (ptr & len) - Read one MAU from objectName + offset and store in container. Alternately, read len MAU starting from objectName + offset and store starting at ptr.
GET_HANDLE objectName, handleContainer - Return the handle of the specified object in handleContainer.
OBJ objectName, objectClass - Marks the start of an object. objectName is preferably unique within the application.
OPEN objectName, pointerContainer - Load objectName if it's not already loaded. Return a pointer to the object in pointerContainer.
PUT objectName, offset, value | (ptr & len) - Write value to objectName + offset. Alternately write len MAU from ptr to objectName + offset.
RETURN toObjectName - If CODE object toObjectName is not present in local memory, load it. Transfer control to toObjectName via return linkage.

The exact syntax used to express the directives in a source file, and the arguments which need to be explicitly specified by the programmer/source code annotator, are dependent on the language in which the application is written and the capabilities of the source processing tools available for the target processor.

One method of 'naturally' partitioning an application is to define each function in the application as a CODE object, and each data structure in the application as either a CDATA object or a VDATA object (i.e., an 'xDATA' object). A CDATA object comprises 'constant' data, such as a table of values. A VDATA object comprises 'volatile' or read/write data, such as input/output data or the application's state. Each CODE or xDATA object is indicated as being an object by bracketing it with directives that define the boundaries of the object and the type of object. The following pseudocode shows function F being defined as a CODE object by bracketing it between OBJ and ENDOBJ directives:

```
OBJ(F,CODE);
    -- Body of F--
ENDOBJ( );
```

In accordance with one aspect of the present invention, object names may be unique within an application. This will allow each name to bind to a unique memory image. In accordance with this aspect of the present invention, multiple instances of an object could not appear in an application, just as two functions having the same name and calling parameters could not coexist in the same application.

Dependencies

The method of the present invention provides a mechanism for exposing the structure of an application as a set of inter-dependent objects. In the model representing the present method, only CODE objects have dependencies, i.e., CDATA and VDATA objects are considered independent. For example, with respect to a CODE object, data dependencies are those data objects that must be present in local memory during the execution of the CODE object, as exposed by OPEN directive occurrences. Code dependencies are created when a CODE object CALLs or BRANCHes or RETURNs to other CODE objects.

The concept of "exercising a dependency" may be defined as "using what an entity is dependent on." For example, when X CALLs Y, Y is exercised by X. If a data table is exercised, one or more of its elements is accessed. Exercise of a dependency occurs either explicitly or implicitly.

Explicit exercise of a dependency occurs via an ODE directive so that the retargeting phase of the present method can implement the directive as a specific instruction sequence required to effect the required behavior on the target execution platform. An explicit exercise is a trap door into the Object Management System (OMS), the target-specific mechanism responsible for acquiring, managing and updating program objects in real-time or near real-time.

Table 2 (below) lists the directives through which program objects can be explicitly exercised.

TABLE 2

Program Object Explicit Exercise Directives

| Class | Unique Method(s) |
|---|---|
| CODE | CALL, RETURN, BRANCH |
| CDATA | OPEN, CLOSE, GET |
| VDATA | OPEN, CLOSE, GET, PUT |

Implicit exercise of a dependency occurs when an object is manipulated directly through a pointer (returned by OPEN, see below), rather than through a directive. This allows increased speed of execution (e.g. direct access to a memory table during convolution) and makes the full instruction set of the processor available to the programmer.

Program Object Access and Scope

When it is desired to manipulate the content of an object implicitly, the Object Management System may be notified that access to the object is required and a pointer 'p' to the object can be obtained. This is accomplished by the OPEN directive:

```
OBJ(X,CODE);
    --some code --
    pY = OPEN(Y);           // get Y's image, pY points to Y
    -- some code exercising Y using pY --
    CLOSE(Y);               // Y goes out of scope
    -- some final code --
ENDOBJ( );
```

The OPEN directive returns a pointer to the specified object and marks, within the application flow, the point at which the object is made available for implicit exercise. The CLOSE directive notifies the Object Management System that the specified object is no longer needed and the associated memory may be freed if no other objects are dependent on it.

In accordance with one aspect of the present invention, within a dependent CODE object, OPENs and CLOSEs may be balanced. Furthermore, in accordance with another aspect of the present invention, each dependent object may explicitly OPEN and CLOSE objects on which it is dependent. If a CALLed object needs access to an object used in a CALLing object, it may explicitly OPEN and CLOSE the object itself. Pointers for implicit exercise are valid only within the confining OPEN/CLOSE pair.

Note that an object does not need to be OPENed before explicitly exercising it. An explicit exercise trap is sufficient for the Object Management System to determine if the associated object is resident and, if not, to suspend the exercising object and transfer the object from bulk memory to fast memory. Thus, for example, a CODE object does not have to be OPENed before being CALLed.

Data Object Access via GET and PUT

There are occasions where it is desirable to access only a few elements of a data object, as in a structure operation. The present method provides three mechanisms for implementing such access: implicit access, explicit local access, and explicit remote access to a data object.

In implicit access, an object is OPENed and the desired element(s) are then accessed via the object pointer:

```
OBJ(X,CODE);
    pY = OPEN(Y);           // get Y's image, pY points to Y
    *(pY+3) += 1;           // Y[3] = Y[3] + 1
    CLOSE(Y);               // Y goes out of scope
ENDOBJ( );
```

Explicit Local Access uses OPEN, GET and PUT to explicitly access an object locally (i.e. from fast memory):

```
OBJ(X,CODE);
    OPEN(Y);                    // get Y's image, no pointer returned
    PUT(Y,3,GET(Y,3)+1);        // Y[3] = Y[3] + 1
    CLOSE(Y);                   // Y goes out of scope
ENDOBJ( );
```

If Y is a large object, both prior solutions are potentially overhead-expensive. The entire object must be fetched, even though only one datum of information is modified. To make this type of access more efficient, one may use Explicit Remote Access, where GET and PUT are used without OPENing the exercised object:

```
OBJ(X,CODE);
    PUT(Y,3,GET(Y,3)+1);        // Y[3] = Y[3] + 1
ENDOBJ( );
```

In the above case, the Object Management System (OMS) may be implemented in one of two ways. The OMS may perform implicit OPENs and CLOSEs, resulting in the same behavior as in the explicit local access example. Alternatively, the OMS may access the specified element(s) directly from, and update the element directly to, bulk memory rather than fetching the entire object. This 'remote' mechanism can dramatically reduce object acquisition and update penalties.

Vector Access

GET and PUT can also transfer multiple minimum addressable units of data directly:

```
OBJ(X,CODE);
    GET(Y,3,p,5);           // Get Y[3] through Y[7] in *p
    -- Modify *p --
    PUT(Y,3,p,5);           // Update Y[3] through Y[7]
ENDOBJ( );
```

Object Handles and Dynamic Binding

To this point, objects have been referenced explicitly by name. This constitutes static binding, in which knowledge of object usage is available at compile time. Often, however, the identity of the object to be exercised may not be known until run time. For example, the application may choose one of several data tables depending on run-time conditions. One typical way to handle this situation is to code a table of pointers to the tables, then index the table at run-time to get the pointer for the specific table required. The pointer table is statically bound at compile time, but dynamically referenced at run time.

In a limited memory environment as dealt with by the method of the present invention, this solution of statically binding pointers at compile time is not available because program object pointers exist only at run-time within the scoping OPEN/CLOSE directives of an exercising CODE object. Pointers cannot be statically bound into a data table because the pointers do not exist at build time. To allow use of the programming paradigm described above, the present method defines the concept of Object Handles. An Object Handle is a numeric, rather than symbolic, reference to a program object. The DEF_HANDLE directive returns an object handle as illustrated by the following code:

```
OBJ(ptrTab,CDATA);
    OBJ_HANDLE array[3] = {
        DEF_HANDLE(T1);     // define handle for object T1
        DEF_HANDLE(T2);     // define handle for object T2
        DEF_HANDLE(T3);     // define handle for object T3
    };
ENDOBJ( );
```

The GET_HANDLE directive is used to access a handle from the table, which can then be used as if it were a name in any of the other directives:

```
OBJ(someFunction,CODE);
    -- some code that gets a table index I --
    pPtrTab=OPEN(ptrTab);                          // OPEN ptrTab
    hTable=GET_HANDLE(pPtrTab+(I*Obj_handle_size));   // read handle
                                                      // from table
    CLOSE(ptrTab);                    // don't need ptrTab
    pObj=OPEN(hTable);                // OPEN table by handle
    -- use the selected table --
    CLOSE(hTable);                    // CLOSE table by handle
    -- some more code--
ENDOBJ( );
GET_HANDLE can also be used directly on named objects:
    OBJ(someOtherFunction,CODE);
        if (someCondition)
            h = GET_HANDLE(objX);
        else
            h = GET_HANDLE(objY);
        CALL h;                       // calling via handle
    ENDOBJ( );
```

Natural Partitions and Flow Breaks

In any significant piece of application code, there are natural partitions which are effectively defined by the code itself, apart from the functional (e.g. function, table, structure) partitioning described earlier. These partitions occur at change-of-flow points, or flow breaks. A flow break occurs when a CALL or BRANCH is made. All code between flow breaks will inevitably execute, so it is advantageous to package all such sequential code, terminated by a flow break, as an object. If performed globally, such an exercise results in an application with "natural" partitioning. Such natural partitioning is advantageous when compared with traditional fixed-line-size hardware cache. These 'natural partitions' are analogous to variable cache lines, specific to the application.

The present method ensures that such naturally partitioned objects will execute in their entirety, which is an advantage over traditional cache operation, wherein a cache miss results in a fetch of the requested data/instruction group, as well as the "next data/instruction group", based on the assumption that future execution or access will occur in that group. In the present method, the program object-based nature of the application partition means that a "cache miss" will result in the fetching of exactly the data required. Since flow breaks are already marked by directives (e.g., BRANCH, CALL), no additional work is required to enable natural partitioning. Such flow-break partitioning can be automated or manually (programmer) directed.

The following code presents an example of a manually inserted flow break:

```
OBJ(X,CODE);
    -- some code --
    BRANCH(LT,Y,BREAK); // on less-than, goto Y
    -- some more code
ENDOBJ( );
```

In this example, it is obvious to a practitioner in the art (e.g., a programmer) that the code forks at the BRANCH. Since the portion of the code after the BRANCH may or may not be executed in a given instance, fetching this portion as part of X will sometimes prove a wasted effort. Thus, a BREAK may be coded into the BRANCH, directing the ODE-aware source processor (compiler or assembler) to end X with the BRANCH and start a new, non-programmer-defined object (e.g., X_0) after the BRANCH. The BRANCH directive now always triggers acquisition of a new object, either Y or X_0.

Following is an additional example of a manual flow break:

```
OBJ(A,CODE);
    -- some code --
    CALL(B,BREAK); // call B, return to A_0!
    -- some more code
ENDOBJ( );
```

In the above example, the return from B actually triggers acquisition of A_0. This example shows why implementation of manual breaks is optional: the run-time required to implement such a bifurcated flow change may cause an unacceptable performance impact. Manual BREAKs allow an integrator to fine-tune performance by selective insertion of BREAK directives.

Automatic global partitioning may optionally be performed by instructing the ODE-aware source processor to always insert breaks at flow change directives (CALL, BRANCH), i.e., as if all flow break directives were annotated with the BREAK directive. This results in a naturally partitioned application with perhaps considerably more objects than were defined by the programmer. Such an implementation may be useful on platforms with hardware-assisted object acquisition. In any event, such a step is completely transparent to the programmer and application.

Entry Point

Every application must have an entry point at which it starts execution. The ENTRY directive exposes the program CODE object that serves as the execution "seed":

ENTRY X

This example marks program CODE object X as the entry point for the application.

Program Structure Extraction

The next step in the present method, step 130 (shown in FIG. 1), is performed after the application source code has been annotated by insertion of the ODE directives described above. The purpose of this phase is to extract program structural information, exposed by the ODE directives, directly from the application.

Figure 4:
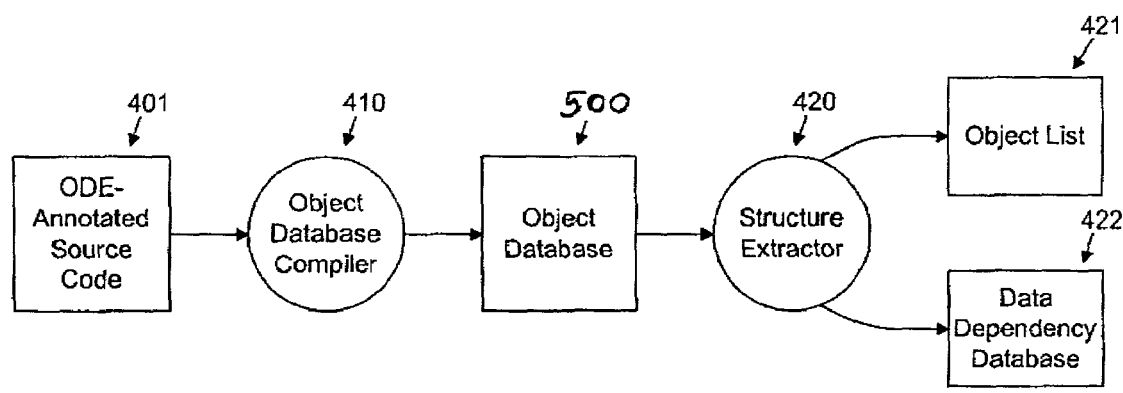
FIG. 4 is a diagram showing the steps involved in extracting application structural information from an application annotated with program object directives.

FIG. 4 is a diagram illustrating the process of extracting this structural information from the application. As shown in FIG. 4, the directive-annotated source code 401 is processed through the Object Database Compiler 410, producing the Object Database 500. Object Database 500, illustrated in FIG. 5, comprises an Object Table 510, Entry Descriptor 516 and any number of Object Descriptors 530. Following is a description of the Object Database 500 and an exemplary manner in which it is produced by the Object Database Compiler 410.

The Object Descriptor 530 is the lowest-level structure in Object Database 500. Each object in an application has associated with it a unique Object Descriptor 530. The plurality of Object Descriptors representing all objects in an application is termed the Object Descriptor Pool 550. The Object Database Compiler 410 generates Object Descriptors 530 from ODE OBJ/ENDOBJ directive pairs encountered in the source code (and from flow breaks, if any). The Object Descriptor 530 specifies the object's class, size and name.

For CODE objects only, the Object Descriptor also contains a list (which is possibly empty) of Dependency Descriptors 532. These Dependency Descriptors 532 collectively constitute an object's Dependency List 540. Each Dependency Descriptor 532 specifies an Object Descriptor pointer 536 (identifying the object the listing object is dependent on) and the "Exercise Type" 537 of dependency (BRANCH, CALL, OPEN). Each Dependency Descriptor 532 is generated from an ODE exercise directive encountered in the source (duplicate references to the same object are filtered). Note that handle-based exercises are marked with a NULL Object Descriptor Pointer 536.

Figure 5:
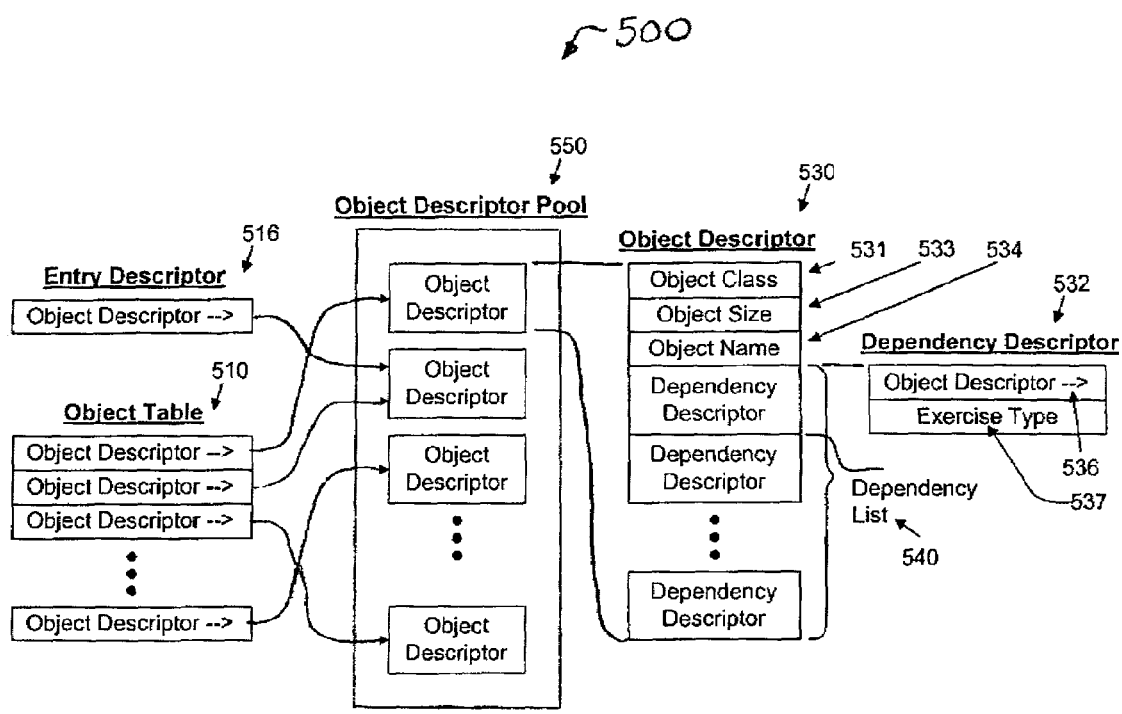
FIG. 5 is a diagram illustrating the Object Database.

As shown in FIG. 5, the Object Table 510 is an array of pointers to the Object Descriptors 530 of all program objects comprising the application. By locating and traversing Object Table 510, the Structure Extractor 420 is able to determine the number, types, sizes and attributes of all program objects.

The Entry Descriptor 516 points to the Object Descriptor of the CODE object that serves as the application's entry point. The Object Database Compiler generates Entry Descriptor 516 when the ENTRY directive is encountered in the source code.

Generation of the Object List 421 and Data Dependency Database 422 by the Structure Extractor 420 is next explained, using the Object Database 500 as input. The Object List 421 is generated by extracting the object information from the Object Table 510 in the Object Database 500, sorted by object type and name. The Object List 421 lists all objects of all types in the application. In addition, unique integer Object IDs are assigned to each CODE object in the application. These are used in the retargeting phase to resolve the context of exercised overlay data objects. This is explained in detail below in the application retargeting section.

An example of an Object List 421 is shown below in Table 3.

TABLE 3

Object List

| Object Name | Object ID | Type | Size |
|---|---|---|---|
| A | 1 | CODE | 257 |
| B | 2 | CODE | 33 |
| C | 3 | CODE | 271 |
| T1 | 4 | CDATA | 1700 |
| T2 | 5 | CDATA | 3400 |
| D1 | 6 | VDATA | 46 |
| D2 | 7 | VDATA | 644 |

The Data Dependency Database 422 is generated by the Structure Extractor 420 from information in the Object Database 500. The Data Dependency Database 422 enumerates, for each CODE object in the application, those CDATA and VDATA objects that the CODE object can OPEN (and therefore implicitly exercise) during its execution. This information is necessary during memory allocation.

Table 4 is an example of a Data Dependency Database 422:

TABLE 4

A: D1, D2, T1
B: D2, D4
C:

The first line in Table 4 indicates that CODE object A, at some point in its execution, OPENs data objects D1, D2 and T1. The second line indicates CODE object B's dependence on data objects D2 and D4. The third line indicates that CODE object C has no data dependencies.

Figure 6:
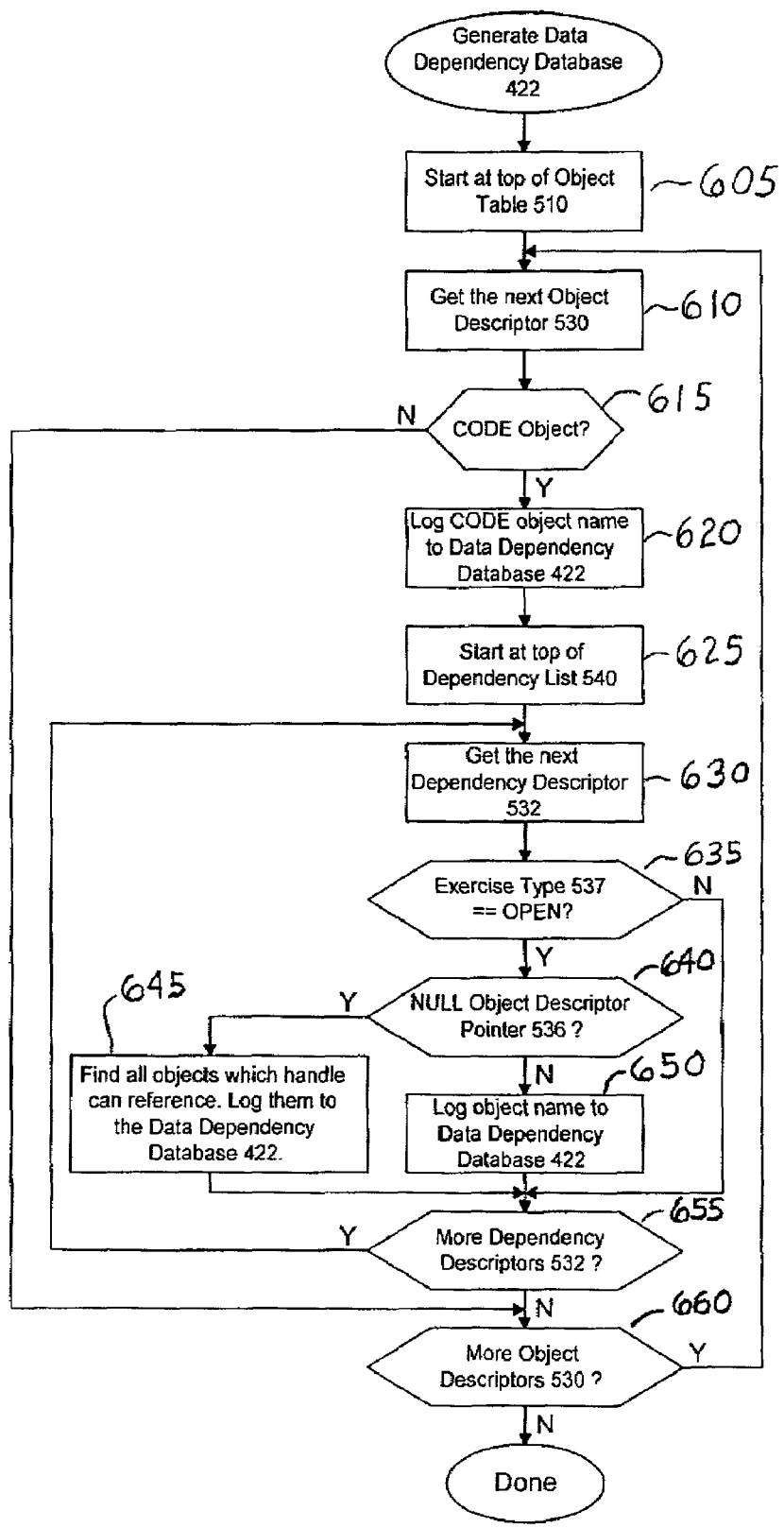
FIG. 6 illustrates the process of generating the Data Dependency Database.

FIG. 6 illustrates the process of generating the Data Dependency Database 422. As shown in FIG. 6, the Data Dependency Database 422 is generated by traversing the Object Table 510 of the Object Database 500 at steps 605, 610, 660. For each CODE object found at step 615 (as indicated by the Object Descriptor 530 Object Class field 531), the Dependency List 540 is traversed, at steps 625, 630, 655. Each CDATA or VDATA dependency found, at step 640, is logged to the Data Dependency Database 422 at step 650.

Note here that there is a special procedure required for dependencies on handles. Handles are not resolvable until run-time. When processing the dependencies of a CODE object, if, at step 640, a dependency on a handle is found (indicated by a NULL Object Descriptor Pointer 536 and an Exercise Type 537 of 'OPEN'), it is necessary to determine the pool of data objects which the handle can reference, at step 645. This is necessary in order to enable the a priori memory allocation technique of the present method. Though it may be possible to automate this via source execution path analysis, often the pool of candidates is small enough and localized to the scope of the exercising CODE entity that manual input of the required list of candidate objects is expedient.

Estimating Object Usage

Figure 17:
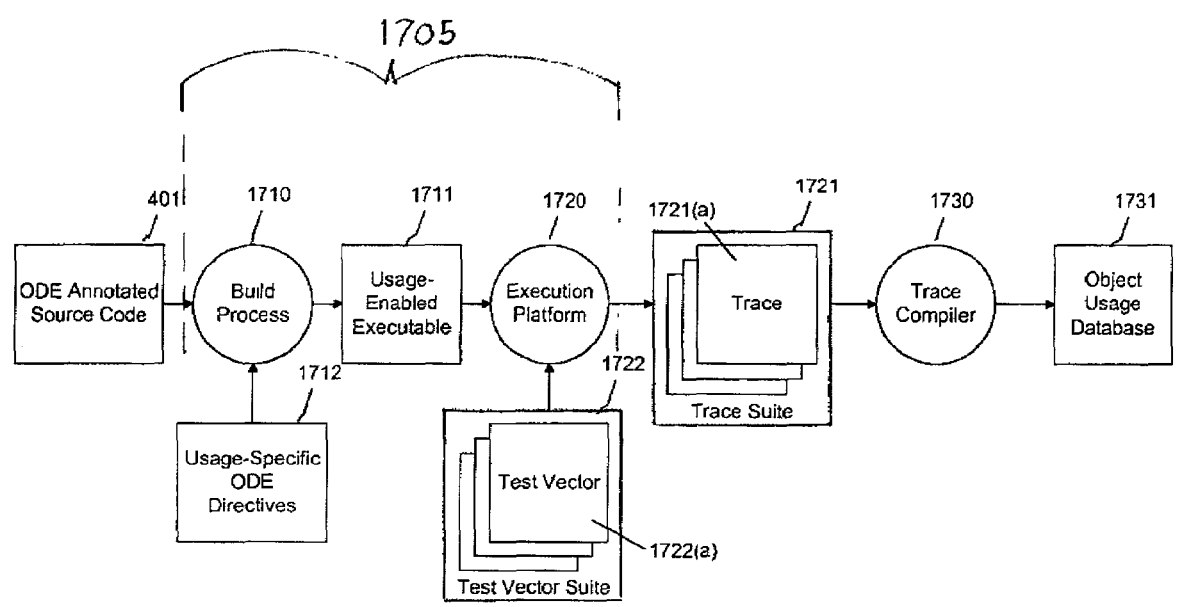
FIG. 17 illustrates the structure extraction process of the present method.

Step 135 (in FIG. 1) occurs after structure extraction. Its function is to estimate the usage of all application program objects during "typical" application execution. This information is used during Memory Allocation 140 to select the best candidates for static allocation. FIG. 17 illustrates the process.

As shown in FIG. 17, ODE-Annotated Source Code 401, with Usage-Specific ODE Directives 1712, is processed through Build Process step 1710, producing Executable 1711. Usage-specific ODE Directives 1712 implement ODE directives CALL, BRANCH, RETURN, OPEN, and CLOSE in such a manner that their execution, at step 1720, causes exercise event information to be written to a Trace 1721(a). Specifically, Executable 1711 is exercised using ('stimulated' by) test vector suite 1722 on execution platform 1720. Test Vector Suite 1722 comprises a plurality of test vectors 1722(a), a concept well-known to practitioners in the art, that define 'typical' stimuli to which the application is likely to be exposed.

Execution of step 1720 thus produces Trace Suite 1721, which comprises a plurality of Traces 1721(a) in one-to-one correspondence with each of the test vectors 1722(a). Trace Suite 1721 is processed by Trace Compiler 1730 to produce Object Usage Database 1731 which enumerates, for each object in the application, the expected (average) number of times the object is exercised (comes into scope) during a 'typical' application 'run'.

The specifics of the procedures performed by Build Process step 1710 and Execution Platform step 1720 are dependent on the specific implementation of the source development environment associated with the native language of the ODE-Annotated Source Code 401.

Figure 2:
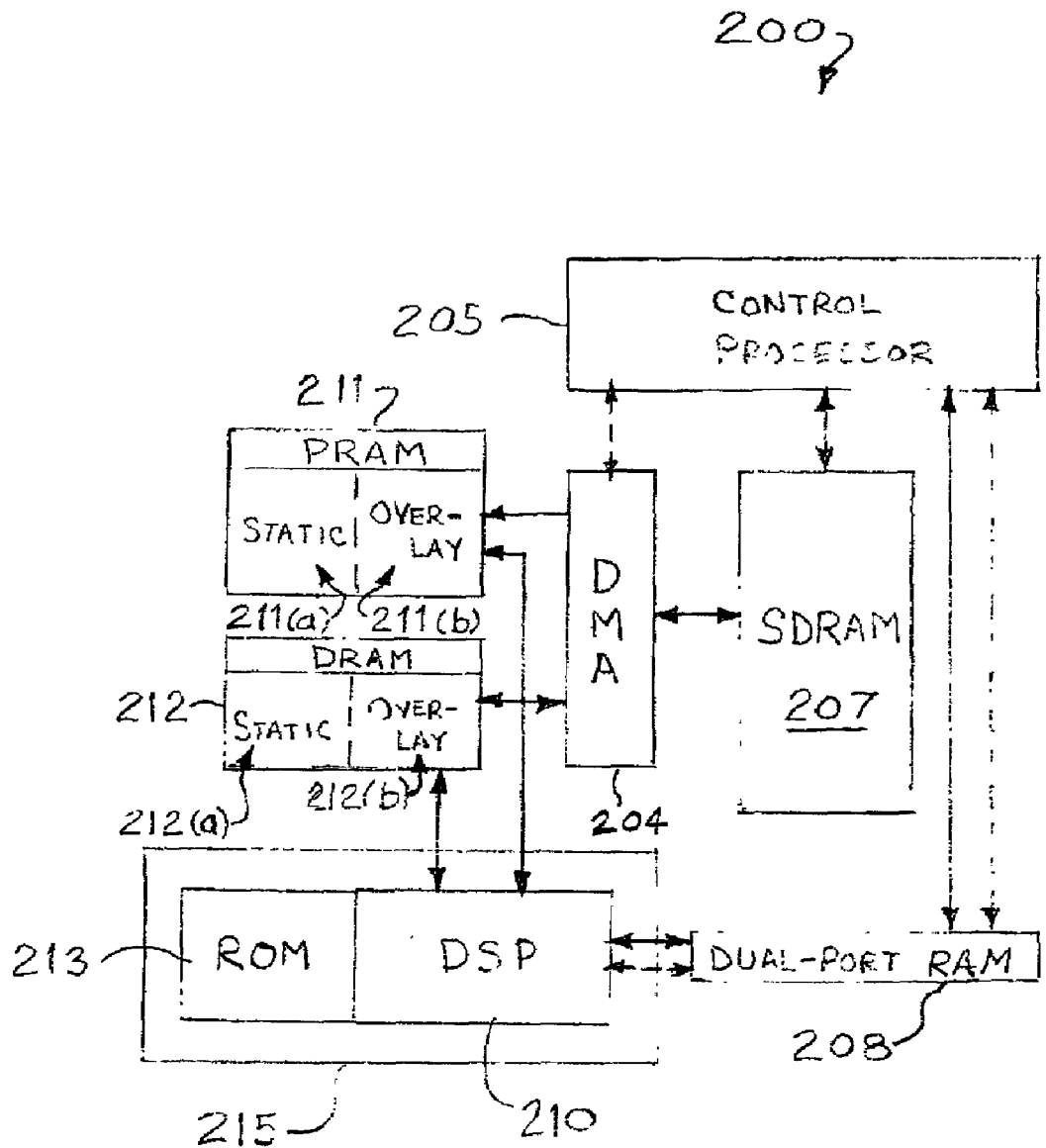
FIG. 2 is a simplified block diagram illustrating an exemplary distributed, multi-processor target platform.

More specifically, an exemplary source development environment 1705 for the target platform 200 of FIG. 2 comprises an assembler, linker and simulator, which are programmed utilities well-known to practitioners in the art. Build Process step 1710 utilizes the assembler and linker. Execution Platform step 1720 utilizes the simulator. An exemplary embodiment of usage-specific ODE directives 1712 for the source development environment 1705 is an include file, or header file, a form well-known to practitioners in the art. Each ODE directive implementation in the include file uses services of the simulator to write information comprising the exercise type and exercised object to Trace File 1721(a) during execution of the application, stimulated by test vector 1722(a), on the simulator. At step 1710, ODE-annotated source code 401 is assembled and linked for execution on simulator 1720, resulting in executable 1711. Simulator 1720 has enough memory to contain the entirety of executable 1711, which runs in a traditional 'flat', non-paged manner while being stimulated by Test Vector Suite 1722, producing Trace Suite 1721.

An exemplary Trace 1721(a) is shown below in Table 5.

TABLE 5

| Step | Trace | Operation | Exercise Count |
|---|---|---|---|
| 1 | CALL X | Fetch X | X = 1 |
| 2 | CALL Y | Fetch Y | Y = 1 |
| 3 | OPEN D1 | Fetch D1 (VDATA) | D1 = 1 |
| 4 | OPEN T1 | Fetch T1 (CDATA) | T1 = 1 |
| 5 | CALL Z | Fetch Z | Z = 1 |
|   |   | Update D1 (save Y's data context) | D1 = 2 |
| 6 | OPEN D1 | Fetch D1 (nested OPEN) | D1 = 3 |
| 7 | CLOSE D1 | Update D1 | D1 = 4 |
| 8 | RETURN | Re-fetch Y (restore Y's code context) | Y = 2 |
|   |   | Re-fetch D1 (restore Y's data context) | D1 = 5 |
|   |   | Re-fetch T1 (restore Y's data context) | T1 = 2 |
| 9 | CLOSE T1 | T1 is CDATA so no update | T1 = 2 |
| 10 | CLOSE D1 | D1 is VDATA so update | D1 = 6 |
| 11 | RETURN | Re-fetch X | X = 2 |
| 12 | RETURN | X terminates |   |

The Exercise Count column shows the operation of Trace Compiler 1730, which processes each Trace 1721(a) of Trace Suite 1721 and keeps an 'exercise count' for each object in the application. This example assumes the memory allocation algorithm defined by the methods referenced by FIGS. 8 and 9 (described in the next section).

An object's exercise count is incremented whenever that object comes into scope, i.e. when it is resident in memory. Note that at this stage, static/overlay decisions have not yet been made, so an exercise count so derived serves to expose an object's potential performance impact as an overlay.

RETURN events are implicit exercises of the returned-to object. Due to the allocation method of FIG. 8 (described in the next section), wherein overlay objects all overwrite each other, a RETURN to an overlay object may require a fetch of that object, hence all RETURNs increment the returned-to object's exercise count. In addition, a RETURN triggers a restoration of the data context of the returned-to object, i.e. the fetching of all data objects that were OPEN at the time the returned-to object did the CALL that caused it to go out of scope. Hence, at step 8 (in Table 5), D1 and T1 have their exercise counts incremented.

When a VDATA object is CLOSED, the object is written back to bulk memory (updated) in order to preserve its state. Due to the allocation method shown in FIG. 9 (described in the next section), this update also occurs when control transfers to a new CODE object, since the method described with respect to FIG. 9 specifies that the overlay memory area 'belongs' to the active CODE object. Thus, at step 5 (in Table 5), D1 within Y's context is updated even though the CALLed Z also uses D1. Note that when a CDATA object is CLOSEd no update is required so its exercise count doesn't change.

An exemplary Object Usage Database 1731 for the single Trace 1721(a) is shown in Table 6 below:

TABLE 6

| | |
|---|---|
| X | 2 |
| Y | 2 |
| Z | 1 |
| D1 | 6 |
| T1 | 2 |

Over a plurality of such Test Vectors 1722(a) and resulting Traces 1721(a), one might find that object usage varies from Trace to Trace. Averaging the individual Traces might produce an exemplary Object Usage Database 1731 shown in Table 7, below:

TABLE 7

| | |
|---|---|
| X | 2 |
| Y | 2 |
| Z | 0.5 |
| D1 | 5.2 |
| T1 | 1.8 |

The Object Usage Database 1731 exposes an application's "typical" object usage, for a given allocation strategy, in a platform-independent 'object domain.'

Allocating Objects to Fast Memory

The next phase in the present method, target memory allocation, is performed at step 140 (in FIG. 1), after the application's structural dependencies and typical object usage characteristics have been determined as described above.

Figure 11:
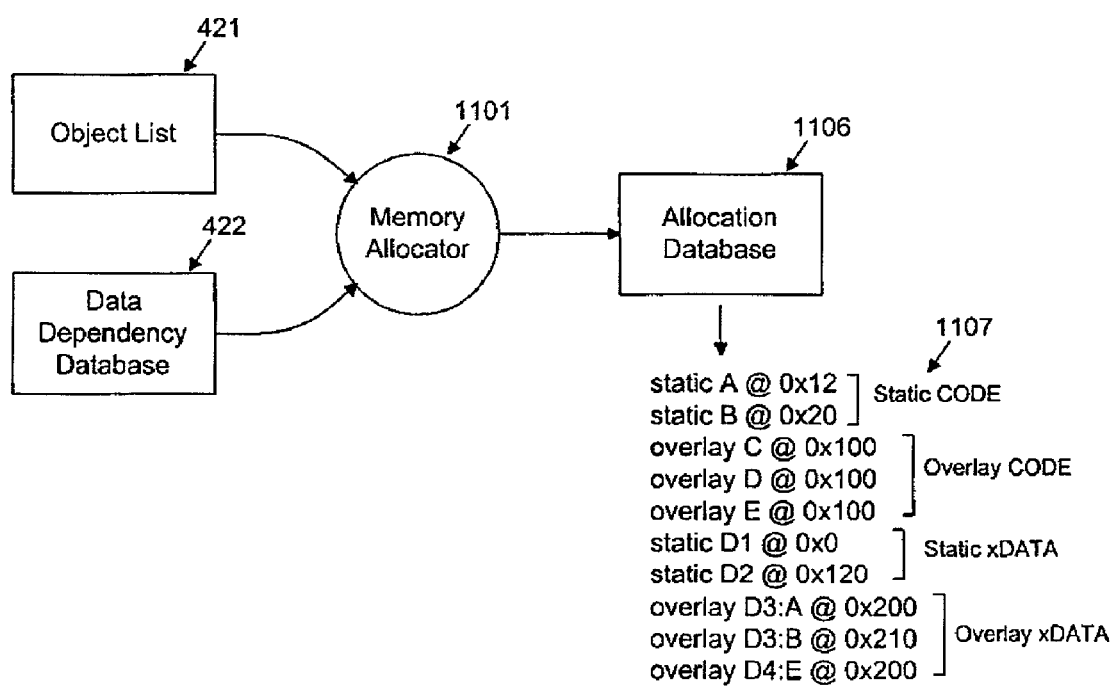
FIG. 11 shows contents of an exemplary Allocation Database.

FIG. 11 illustrates the Memory Allocation process. Object List 421 and Data Dependency Database 422 serve as input to Memory Allocator 1101 which statically allocates as many objects as possible (according to a cost function presented below) to fast memory (static objects), while leaving overlay space for the remainder of the objects (overlay objects). Allocation information is captured in Allocation Database 1106, which specifies, for each of the plurality of program objects comprising an application, whether the object is static or an overlay and what the object's target memory address is. Exemplary Allocation Database 1106 contents 1107 illustrate.

In the preferred embodiment, each object is prioritized for static allocation by a cost function termed 'penalty density'. An object's penalty density is a measure of the cost of acquiring the object as an overlay. The ith object's penalty density $P_i$ depends on the following object and target characteristics:

(a) the object's size $S_i$, from Object List 421;

(b) the object's typical usage $N_i$, from Object Usage Database 1731;

(c) the average number of platform clock cycles $C_i$ of control overhead, required to process a fetch request for object i. This parameter is determined by the OMS implementation for a specific platform and captures the execution time of the ODE directive traps, communication overhead to the object server, and server execution time;

(d) the average number of platform clock cycles $A_i$ required to acquire control (arbitration latency) of the data transfer entity that actually does the transfer of object i. This parameter is determined by analysis or empirical measurement of the target hardware platform bus characteristics; and (e) the average number of platform clock cycles $T_i$ required to transfer object i's image between bulk storage and local memory. This parameter is a function of the size of the object and the bus transfer characteristics of the target hardware platform.

The penalty density $P_i$ for object i is computed using the following formula:

$$P_i = [N_i(C_i + A_i + T_i)]/S_i$$

For illustrative purposes of the memory allocation process, FIG. 2 presents an exemplary target hardware platform 200 on which applications are to run. Platform 200 includes an application processor 215 and associated fast memory 211/212 (here exemplified as a Harvard architecture), which is not large enough to simultaneously contain the entire application's executable code and data image. Target platform 200 represents only one possible exemplary hardware configuration to which the method of the present invention is applicable. For example, processor 210 is exemplified herein as a digital signal processor ('DSP'), but processor 210 could be any other type of processor. It should be noted that the present method is operable with target platforms comprising single processors as well as with platforms comprising distributed processors.

In an exemplary embodiment, application processor 215 includes a digital signal processor (DSP) 210 and ROM memory 213, and is hereinafter referred to simply as DSP 215. Control processor 205, which functions as the 'Object Server' 1323, is used for transferring executable code and data between bulk storage synchronous DRAM (SDRAM) 207 and DSP 215 fast memory, which comprises program RAM (PRAM) 211 and data RAM (DRAM) 212. In FIG. 2, data paths are indicated by solid lines and control paths are indicated by dashed lines. Control processor 205 communicates with DSP 215 via dual-port RAM memory 208. Both data and control information are passed through this dual-port memory 208, which is used to signal memory transfer requests (and the completion thereof) between control processor 205 and DSP 215. Code and data are transferred between SDRAM 207 and DSP program and data RAM 211/212 by a DMA controller 204, which is considered a peripheral device of processor 205.

For a given application, the memory allocation phase of the present method identifies program objects that are candidates for static caching, in which objects are loaded once at the start of, and remain in memory for the duration of, an application's execution. Candidates for static caching are objects that come into scope often during the application's execution. Areas in PRAM 211(*a*) and DRAM 212(*a*) are reserved for these Static Program Objects. The static allocation address assigned to each Static Program Object by Memory Allocator 1101 of the present method is built into the application's load image. Static Program Objects are exercised by direct reference to their addresses.

Those objects that cannot be statically cached because of memory constraints are instead dynamically paged as they are needed. These objects are termed Overlay Program Objects because they may overwrite one another during execution. Overlay Program Object fast memory spaces are allocated in both PRAM 211(*b*) and DRAM 212(*b*) by Memory Allocator 1101. Allocation addresses are assigned a priori and embedded in the load image of the target application.

Figure 8:
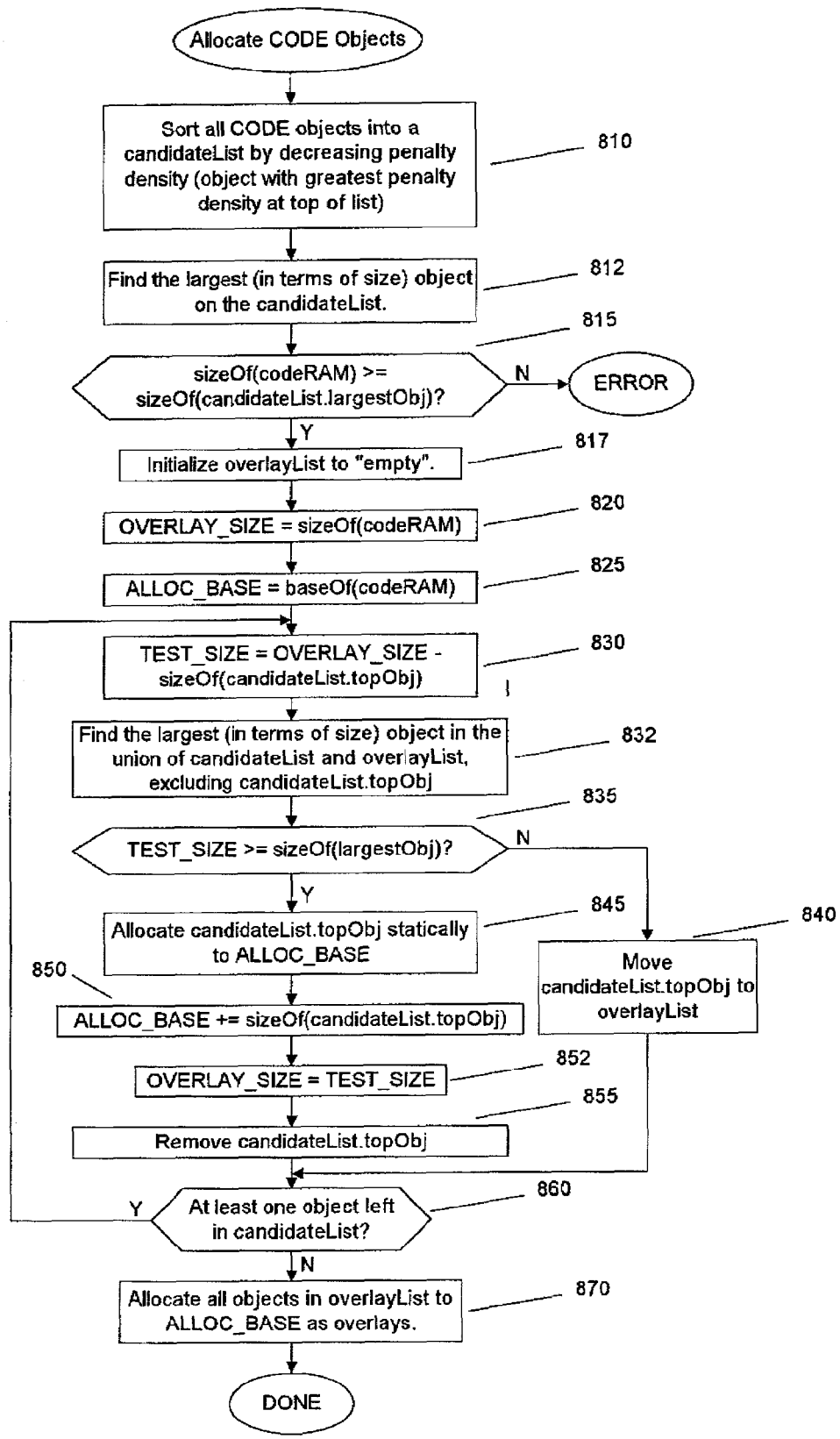
FIG. 8 is a flow chart illustrating a process by which target memory is allocated for CODE objects.

FIG. 8 is a flow chart illustrating an exemplary process by which target memory PRAM 211 is allocated for CODE objects. The algorithm of the present method statically allocates as many CODE objects as possible, to the point where the remaining memory is just large enough to contain the largest non-static CODE object left. All overlay objects overwrite each other in this remaining section.

As shown in FIG. 8, at step 810, all CODE objects are sorted into a Candidate List by decreasing penalty density, with the greatest-penalty object on the top of the list. At step 812, the Candidate List is searched to find the object with the largest size. At step 815, a check is made to ensure that program RAM (PRAM) 211 is large enough to contain the largest CODE object in the Candidate List. If not, the CODE object may be further partitioned, or a larger local memory 211 may be used. If the size of PRAM 211 is sufficient, then, at step 817, an Overlay List is initialized to empty. At step

820, the size of overlay area 211(*b*) in PRAM 211 is initially set equal to the size of the entire PRAM area 211. At step 825, the current base location ALLOC_BASE for allocating static CODE objects in the static area of PRAM 211(*a*) is set to the base location in PRAM 211.

At step 830, the size of overlay area 211(*b*) is adjusted (decreased) by the size of the top CODE object in the Candidate List. At step 832, the Candidate and Overlay Lists are searched to find the object with the largest size, excluding the top object in the Candidate List. A check is made at step 835 to determine whether the adjusted overlay area size is at least as large as the size of the largest CODE object in the Candidate List. If not, then at step 840, the top object in the Candidate List is moved to the Overlay List, and flow proceeds to step 860. If the adjusted overlay size is sufficient to contain the largest CODE object in the Candidate and Overlay Lists, excluding the top object in the Candidate List, then at step 845, the top object in the Candidate List is allocated, as a static program object, to the current base location (ALLOC_BASE) of static area 211(*a*) of PRAM 211. At step 850, the current base location (ALLOC_BASE) of static area 211(*a*) is adjusted (incremented) by the size of the object allocated in step 845 (the top object in Candidate List). At step 852, the size of the overlay area (OVERLAY_SIZE) is adjusted to reflect the decrease in size due to allocation of the object. At step 855, the top object in the Candidate List is removed from the list. A check is made at step 860 to determine if there is at least one object remaining in the Candidate List. If so, then the loop (steps 830–860) is repeated to see if there is sufficient memory left in PRAM 211 to accommodate additional static objects. If, at step 860, there are no objects left in the list, then all objects in the Overlay List are allocated to ALLOC_BASE, where they overlay each other during program execution.

Figure 9:
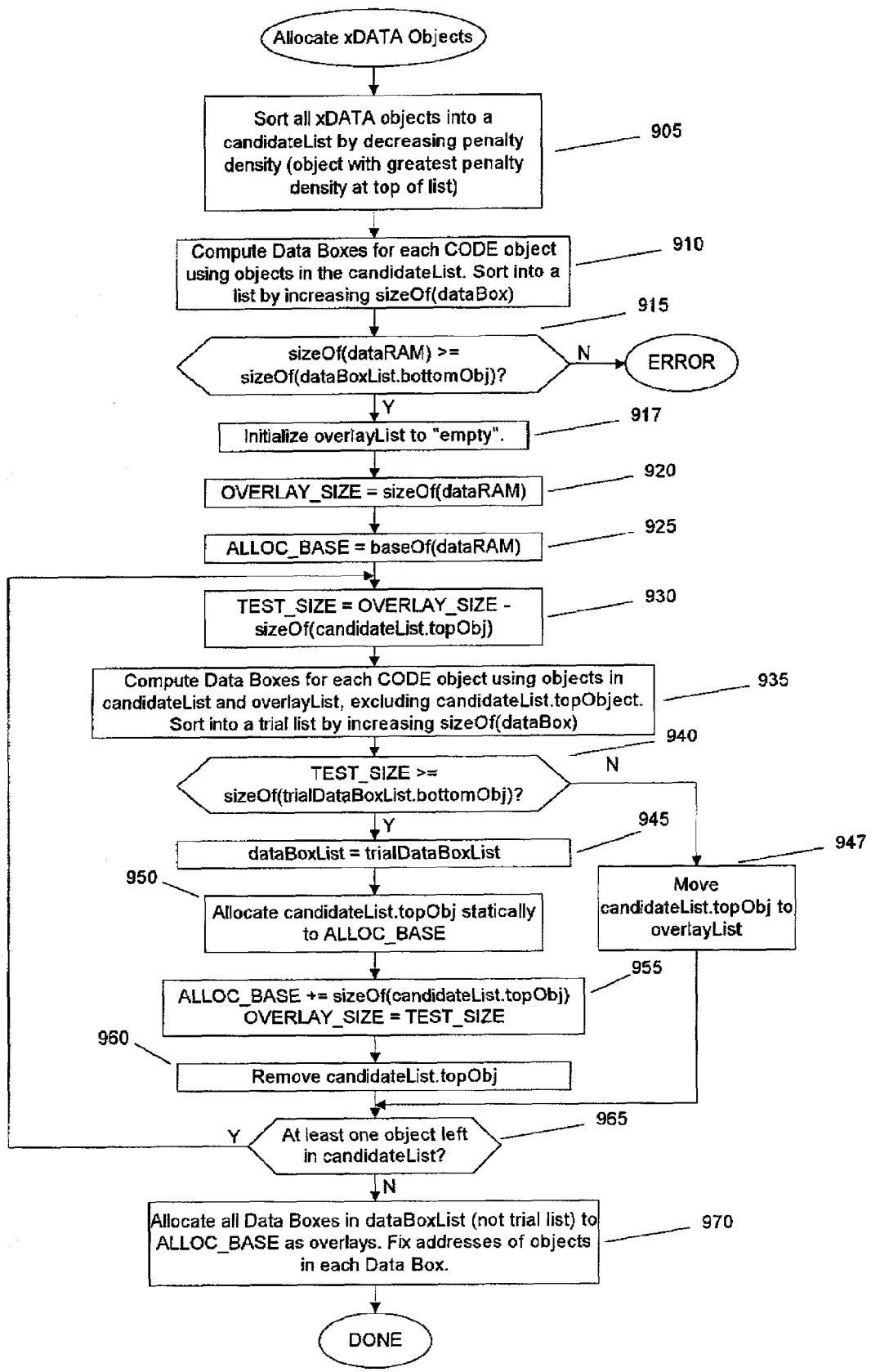
FIG. 9 is a flow chart illustrating a process by which target memory is allocated for DATA objects.

FIG. 9 is a flow chart illustrating an exemplary process by which target memory DRAM 212 is allocated for CDATA and VDATA objects. For data allocation the term "overlay object" refers to a Data Box. A 'Data Box' is the data memory area required to simultaneously contain the data used by a given CODE object, as expressed in the Data Dependency Database 422. The algorithm shown in FIG. 9 is very similar to that for CODE object allocation, except that a distinction is made between static objects (which are CDATA and VDATA objects) and overlay objects (which are Data Boxes).

As shown in FIG. 9, at step 905, all xDATA (CDATA and VDATA) objects are sorted into a Candidate List by decreasing penalty density, with the greatest-penalty object on the top of the list. At step 910, Data Boxes are computed for each CODE object, and the Data Boxes are sorted into a Data Box List by increasing size.

Figure 10:
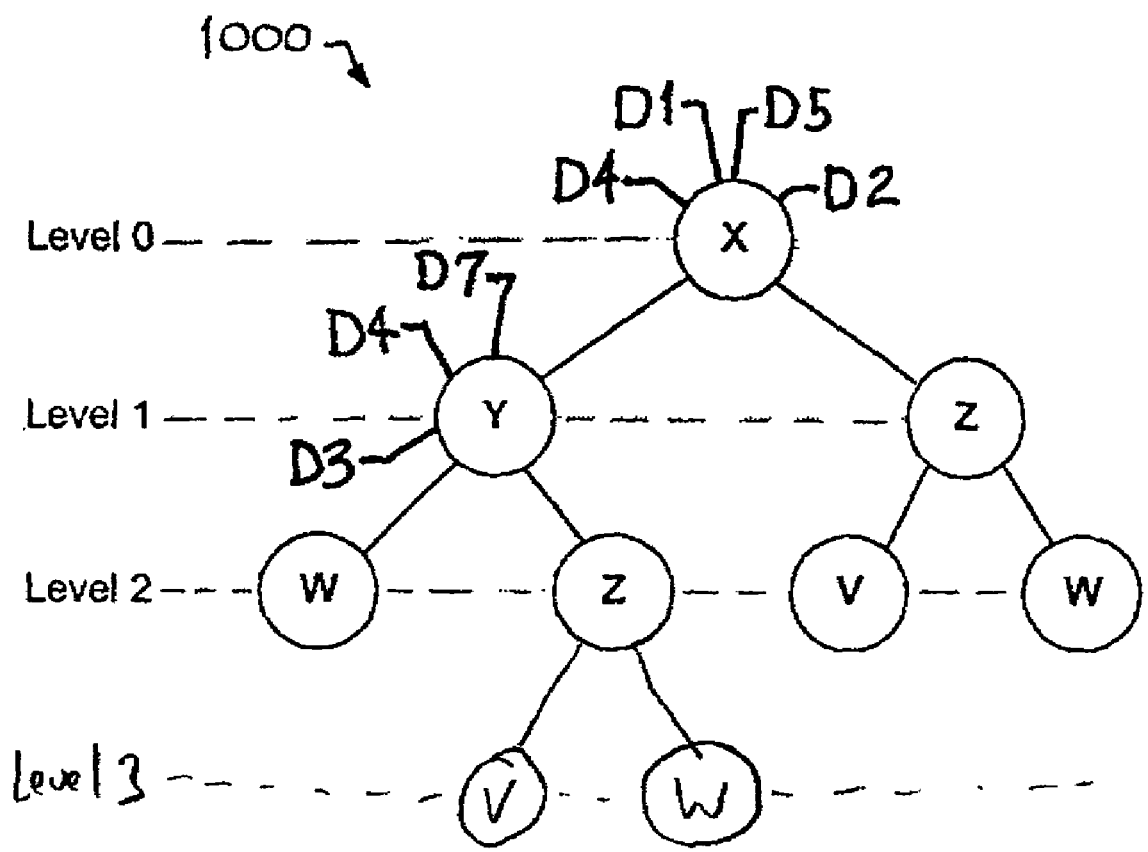
FIG. 10 is a diagrammatic example of a calling tree.

FIG. 10 is a diagram of a calling tree 1000 showing the object dependency structure of an exemplary application annotated in accordance with the present method. As shown in FIG. 10, with reference to the X-Y path, CODE object X is dependent on DATA objects D1, D2, D4 and D5, while CODE object Y is dependent on DATA objects D3, D4, and D7. In FIG. 10, the sizes of the objects are indicated by the numeric part of their names, e.g., D1 has a size of 1 memory unit, D2 has a size of 2 memory units, etc. Assume that, in this example, D1 is allocated statically and D2–D7 are overlays.

Figure 7:
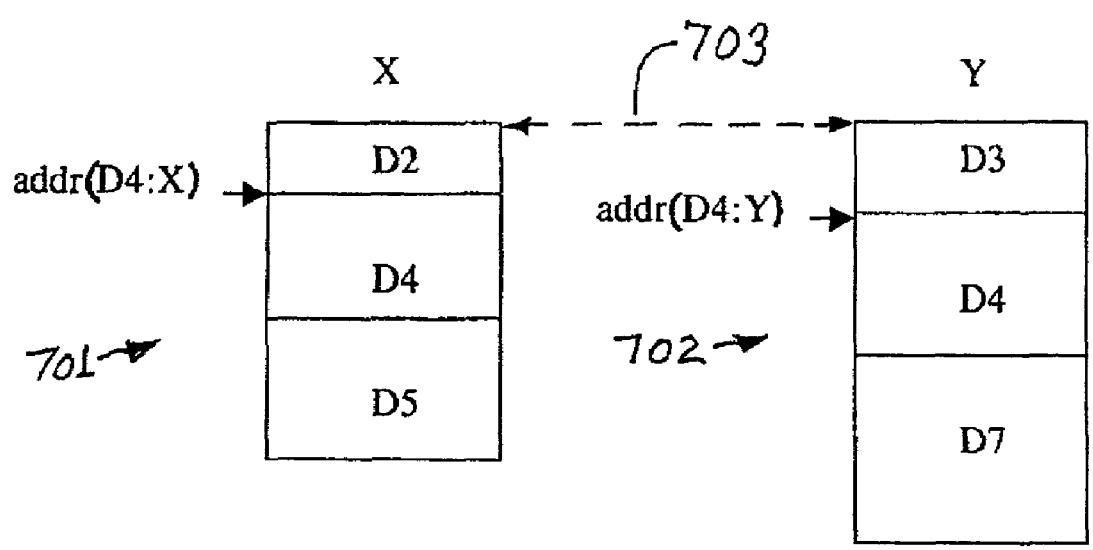
FIG. 7 shows overlay Data Boxes for objects X and Y.

FIG. 7 illustrates the overlay Data Boxes 701 and 702 for objects X and Y, respectively, as shown in FIG. 10. Both of these Data Boxes start at the same address 703 in data memory. Note that even though X and Y both use D4, D4 gets loaded to a different address depending on which CODE object is using it. FIG. 10 illustrates the dependence of D4 on the calling context which is represented by the notation D4:exercisingObject shown in FIG. 7.

As shown in FIG. 9, at step 915, a check is made to ensure that data RAM (DRAM) 212 is large enough to contain the bottom (largest) Data Box in the Data Box List. If not, a larger local memory 212 may be used. If the size of DRAM 212 is sufficient, then, at step 917, an Overlay List is initialized to empty. At step 920, the size of overlay area 212(*b*) in DRAM 212 is initially set equal to the size of the entire DRAM area 212. At step 925, the current base location ALLOC_BASE for allocating static DATA objects in the static area of DRAM 212(*a*) is set to the base location in DRAM 211.

At step 930, the size of overlay area 212(*b*) is adjusted (decreased) by the size of the top object in the Candidate List. At step 935, Data Boxes are computed for each CODE object, using all objects in the Candidate and Overlay Lists, excluding the top object in the Candidate List. The list of Data Boxes thus computed is sorted into a Trial List. A check is made at step 940 to determine whether the adjusted overlay area size is at least as large as the size of the largest (bottom) Data Box in the Trial List. If not, then at step 947, the top object in the Candidate List is moved to the Overlay List and flow proceeds to step 965.

If the adjusted overlay size is sufficient to contain the largest Data Box, then at step 945, the Data Box List is set equal to the Trial List. At step 950, the top object in the Candidate List is statically allocated to the current base location (ALLOC_BASE) of static area 212(*a*) of DRAM 212. At step 955, the current base location (ALLOC_BASE) of static area 212(*a*) and the overlay size (OVRLAY_SIZE) of overlay area 212(*b*) are adjusted by the size of the object allocated in step 950 (the top object in the Candidate List). At step 960, the top object in the Candidate List is removed from the list. A check is made at step 965 to determine if there is at least one object remaining in the Candidate List. If so, then the loop comprising steps 930–965 is repeated to see if there is sufficient memory left in DRAM 212 to accommodate additional static objects. If, at step 965, there are no objects left in the Candidate List, then in step 970, all remaining Data Boxes in the Data Box List are allocated to ALLOC_BASE, where they overlay each other during program execution. The addresses of the overlay objects in each Data Box are then fixed.

Application Retargeting

The next phase in the present method, retargeting the application to a specific target, is performed at step 150 (in FIG. 1). This binds an ODE-annotated application to the OMS. In this phase, the ODE directives play a role analogous to that performed by a program API (Application Program Interface) and the OMS plays a role similar to an operating system such as Unix or Windows. The present method utilizes the ODE directives as a vehicle in performing the "API-like" function of mapping a set of well-defined services to a specific computer's environment.

Figure 12:
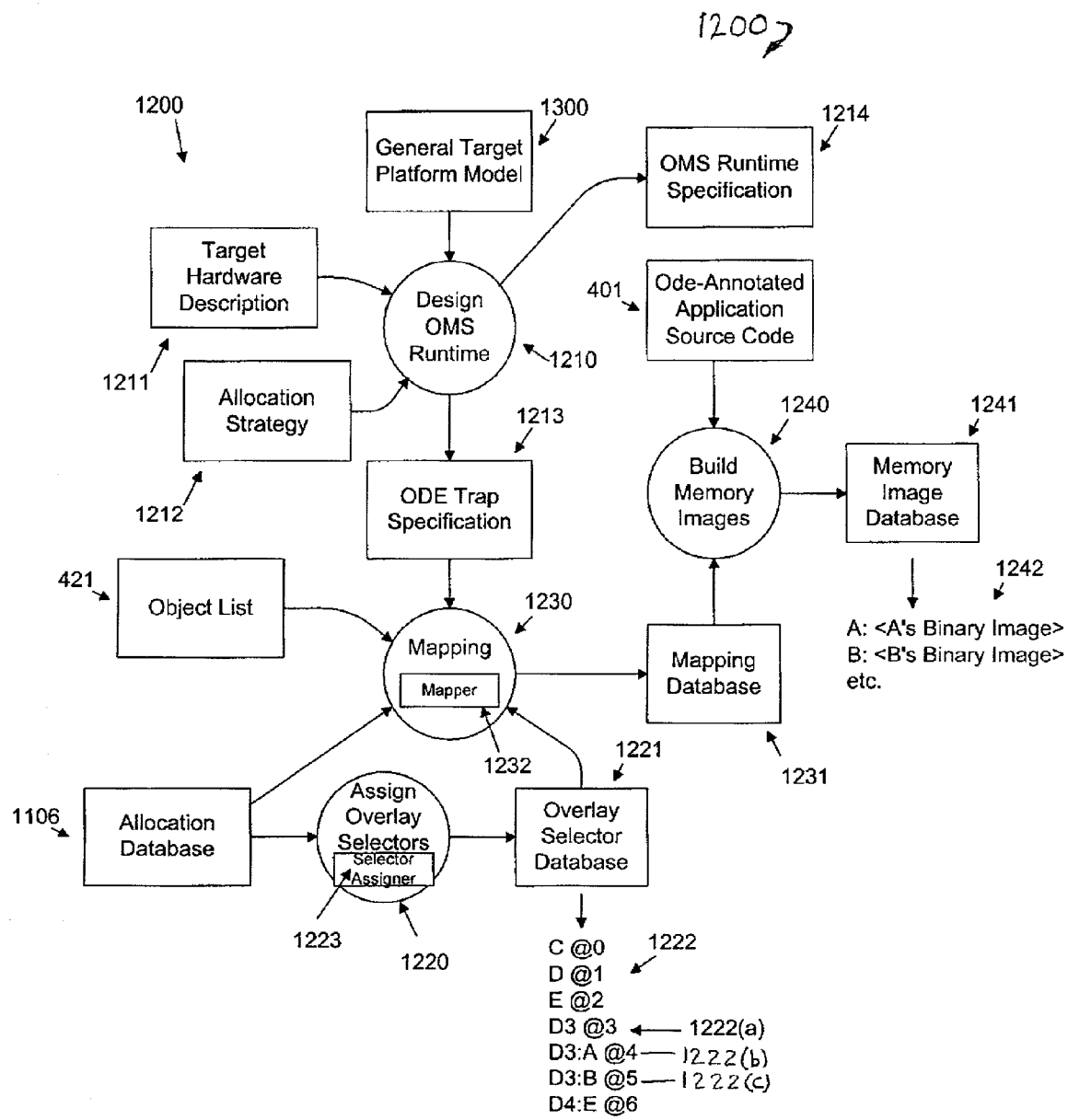
FIG. 12 illustrates the steps involved in the retargeting phase.

FIG. 12 illustrates the steps involved in the retargeting phase of the present method. This phase comprises three distinct activities: Assign Overlay Selectors 1220, Mapping 1230 and Build Memory Images 1240. These activities are described below. The Design OMS Runtime 1210 activity shown in FIG. 12 is deferred until a later section.

Assign Overlay Selectors

The Assign Overlay Selectors activity 1220 is a straightforward assignment of consecutive integer identifiers, starting at 0, to each overlay object in the application. These Overlay Selectors 1222 are embedded within the application executable image, manipulated by ODE directive traps, and ultimately used by Object Server 1323 to index the Overlay Management Array 1322 and quickly access the object's memory residency status and loading information. Overlay data objects exercised from different CODE objects are considered separate objects and therefore have different overlay selectors. The Overlay Selector Database 1221 captures the overlay selector assignments for the overlay objects.

FIG. 12 shows exemplary contents 1222 of an Overlay Selector Database 1221 that corresponds to the contents 1107 of the Allocation Database 1106 shown in FIG. 11. Each line maps an integer Overlay Selector with a CODE object as:

CODE Object Name@ Overlay Selector or with an xDATA object as:

xDATA Object Name Exercising CODE Object Name@ Overlay Selector

In the example shown in FIG. 12, Overlay Data Object D3 is exercised from CODE objects A and B, thus, the overlay selector 1222(*b*) (the integer '4' following the '@' symbol) for D3:A is different from the overlay selector 1222(*c*) (the integer '5' following the '@' symbol) for D3:B. The ":A" and the ":B" following "D3" in overlay selectors 1222(*b*) and 1222(*c*) indicate the respective 'exercised from' contexts of the D3 Object.

The Assign Overlay Selectors activity 1220 recognizes overlay xDATA objects within Allocation Database 1106 that are exercised from more than one CODE context, as in D3 above (e.g. the occurrence of D3:A and D3:B within Allocation Database 106 signifies such a case). In such cases, the Assign Overlay Selectors activity 1220 assigns an additional Overlay Selector for the 'alpha object' (D3 in the example), a context-insensitive entity that enables handle-based references of such multiple-context objects when the exercising context is unclear. This selector is used whenever DEF_HANDLE or GET_HANDLE references targeting such multiple-context objects are encountered in the source, and is resolved by Object Server 1323 via the object's Alpha OMD 1326 and the exercising CODE object's Object ID (see Table 3). This concept is discussed further in the Object Management System section.

Continuing the example of FIG. 12, the Assign Overlay Selectors activity 1220 recognizes that D3 is exercised from more than one CODE context and assigns an overlay selector 1222(*a*) (the integer '3') to context-insensitive alpha object D3. This selector is used whenever 'DEF_HANDLE D3' or 'GET_HANDLE D3' references are encountered in the source. D4 is only referenced from one CODE object, E, and therefore no alpha object for D4 is needed.

Overlay Selector Database 1221 is used by the final phase of the present method, binary image generation, to construct the control structures necessary to manage the transfer of overlay objects to and from the target platform during application execution. An automated Selector Assigner mechanism 1223 (typically a programmed utility) performs the Overlay Selector assignments for all ODE applications across all potential execution targets.

Mapping

As shown in FIG. 12, the Mapping activity 1230 is performed for each application ported to the execution platform, resulting in an application specific Mapping Database 1231, the form of which is target specific. In accordance with the present method, an automated Mapper mechanism 1232 (typically a programmed utility) is manually designed and implemented once per execution target to automate the process of Mapping Database generation 1231. The implementation of Mapper 1232 depends on the target-specific ODE Trap Specification 1213. Individual invocations of Mapper 1232 accept the Object List 421, Allocation Database 1106 and Overlay Selector Database 1221 as input in order to generate a unique Mapping Database 1231 for each individual application. Mapping Database 1231 for the exemplary target platform of FIG. 2 comprises ODE Directive Include File 1511 and Linker Command File 1521.

Build Memory Images

The Build Memory Images activity 1240 produces the Memory Image Database 1241, comprising binary memory images of all program objects comprising the application, as illustrated by exemplary contents 1242. The binary memory image of a program object is the object's contents: executable code for CODE objects; constant data values for CDATA objects; and initializing data values for VDATA objects. An exemplary description best serves to illustrate the Build Memory Images 1240 activity. Assume again the exemplary target platform 200 of FIG. 2 and the previous discussion of Mapping Database generation 1231.

Figure 15:
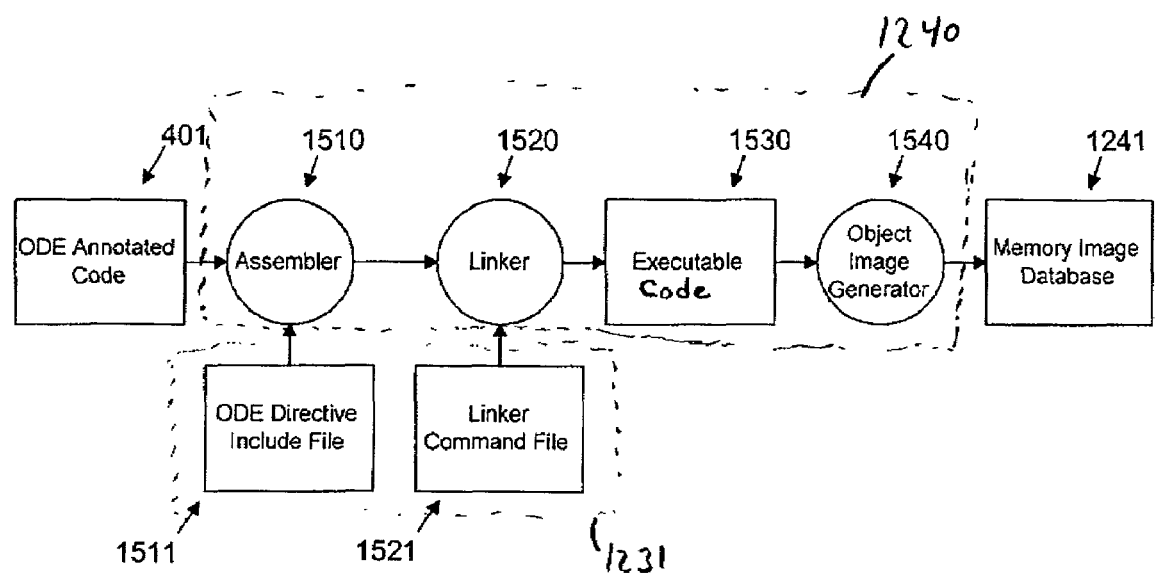
FIG. 15 illustrates an implementation of the Build Memory Images activity.

FIG. 15 illustrates an exemplary implementation of the Build Memory Images activity 1240. At step 1510, ODE Directive Include File 1511 is assembled with every application source module comprising ODE Annotated Code 401. This include file contains implementations of all ODE directives in accordance with ODE Trap Specification 1230 (explained in a subsequent section), Object List 421, and Allocation Database 1106, all via Mapping phase 1230. The object code output (relocatable machine code for target processor 215) from the assembly is then linked with the Linker Command File 1521, at step 1520, producing the executable code 1530. Linker Command File 1521 directs where program objects are located in accordance with Allocation Database 1106 via Mapping phase 1230. Executable code 1530 is processed by the Object Image Generator utility 1540, which parses the known structure of executable code 1530 and extracts the binary memory images of each program object by examining the Object ID in the upper portion of the address, as established by the location instructions in Linker Command File 1521 (see the OBJ Macro description in the subsequent Directive Implementations section). The object images are then written to Memory Image Database 1241.

Generate Binary Image

Figure 16:
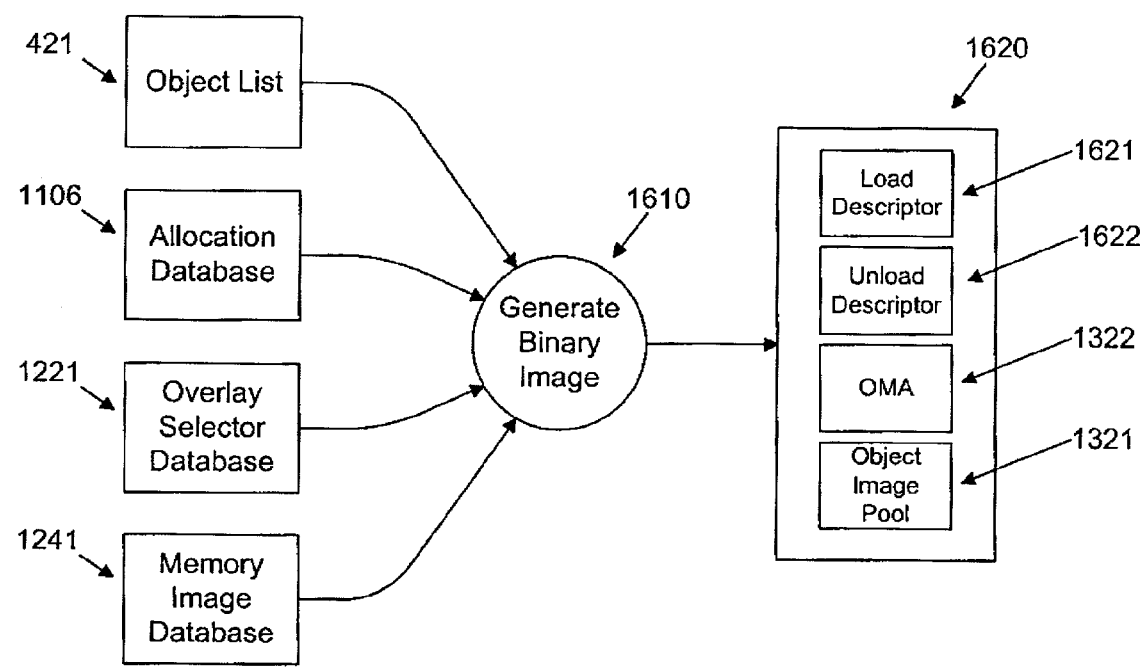
FIG. 16 shows the input and output entities for generating a binary image for execution on a target platform.

FIG. 16 shows the input and output entities for generating Binary Image 1620 for execution on a target platform in accordance with an exemplary embodiment of the present invention. The Generate Binary Image step 160 (in FIG. 1) comprises a Generate Binary Image process 1610, which produces a Binary Image (BIM) 1620. For the method of the present invention, BIM 1620 serves the same purpose that executable code 1530 does in a monolithic memory environment, i.e. BIM 1620 is the executable entity for a limited memory platform that utilizes the technology of the present invention.

BIM 1620 contains two classes of information:

(1) Object Image Pool 1321 comprising the CODE and xDATA object images from Memory Image Database 1241;

(2) control structures that contain the information necessary to manage the decisionless, table-driven transfer of these objects at run-time.

Item (2), above, further comprises two classes of information:
  (a) control structures Load Descriptor 1621 and Unload Descriptor 1622 that respectively manage the decisionless, table-driven transfer of statically-allocated objects
    i) from bulk memory 207 to DSP program and data fast memory (PRAM/DRAM) 211(*a*)/212(*a*) prior to running the program (code and data load descriptors); and
    ii) from DSP data fast memory DRAM 212(*a*) to bulk memory 207 after running the program (data unload descriptors); and
  (b) Overlay Management Array (OMA) 1322, that manages the decisionless, table-driven transfer of overlay objects between DSP program and data fast memory 211(*b*)/212(*b*) and bulk memory 207 during run-time.

In the exemplary target platform of FIG. 2, the load/unload descriptors and the Overlay Management Array are located in SDRAM 207. Both types of control structures embed the DMA transaction information. This transaction information includes the DMA parameters necessary for a block data transfer between SDRAM 207 and program/data RAM (211/212) that allows the run-time management process to be a low-overhead, decisionless table-lookup process.

Following is a description of BIM 1620 creation by the Generate Binary Image activity 1610.

Load Descriptor 1621 comprises a list of components of the form of 1325(*b*), each of which describes a static program object (CODE, CDATA or VDATA). All such static objects defined in the application, as enumerated in Allocation Database 1106, are represented in Load Descriptor 1621. Each static object is loaded from Object Image Pool 1321 to target memory prior to running the application. Load Descriptor 1621 thus serves to drive the load phase of the application life cycle.

Unload Descriptor 1622 comprises a list of components of the form of 1325(*b*), each of which describes a static VDATA program object. All such static objects defined in the application, as enumerated in Allocation Database 1106, are represented in Unload Descriptor 1622. Each static VDATA object is unloaded from target memory to Object Image Pool 1321 within Binary Image 1620 after running the application, in order to preserve the application's state between runs. Unload Descriptor 1622 thus serves to drive the unload phase of the application life cycle. CODE and CDATA objects cannot be changed and do not have to be saved.

Overlay Management Array (OMA) 1322 is constructed from information in Allocation Database 1106, Object List 421 and Overlay Selector Database 1221. According to the numeric Overlay Selector ordering in Overlay Selector Database 1221, Object Management Descriptor (OMD) 1325 or Alpha OMD 1326 entries are created. Residency 1325(*a*) is set to 'non-resident'. Src, Dest and Len of entry 1325(*b*) are set to the object's memory image base in Object Image Pool 1321, allocated base address in Allocation Database 1106, and object size in Object List 421, respectively. Overlay List 1325(*c*) is constructed by examining which objects are overwritten by the listing object, per the address information in Allocation Database 1106.

Object Image Pool 1321 is assembled from Memory Image Database 1241.

Exemplary Application Lifecycle

Figure 3:
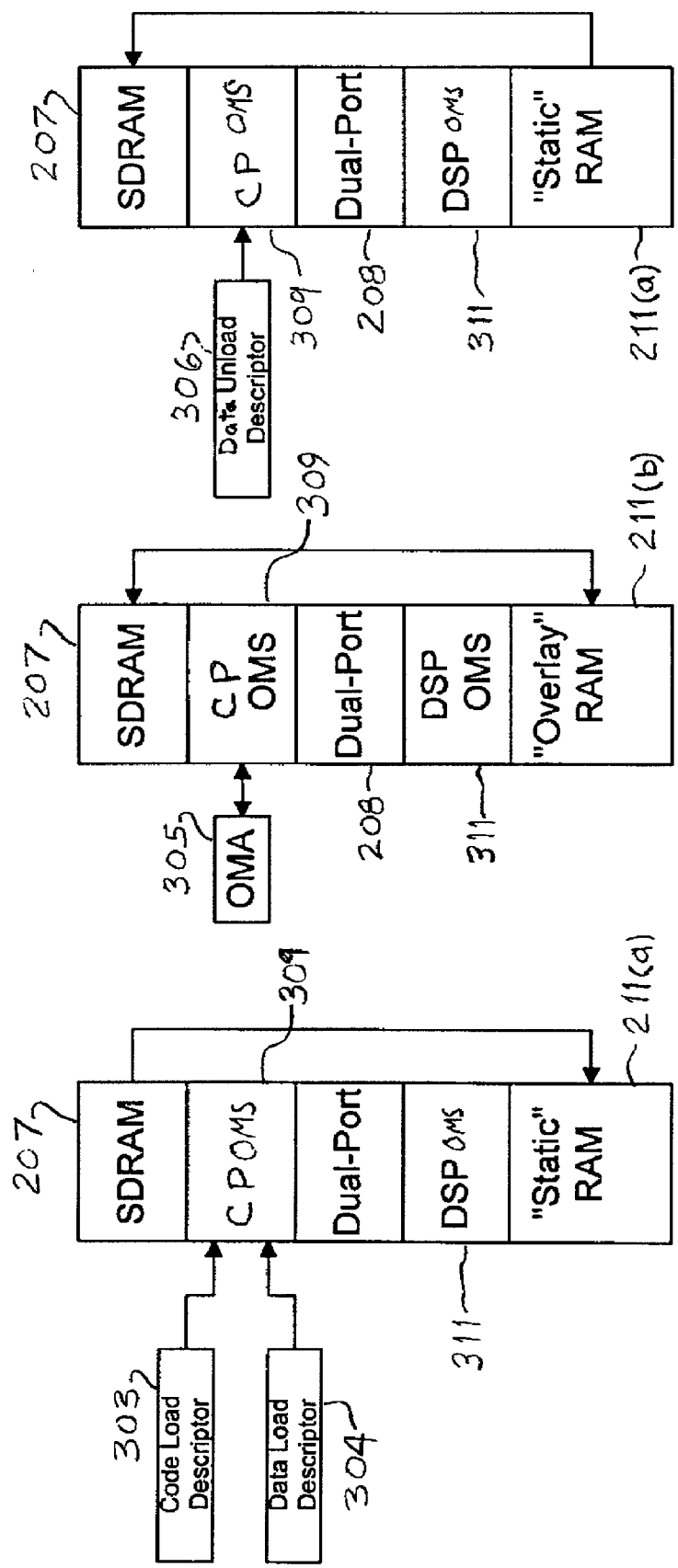
FIG. 3A is memory model showing memory utilization in the target platform of FIG. 2 during a load operation.
FIG. 3B is memory model showing memory utilization in the target platform of FIG. 2 during an overlay operation.
FIG. 3C is memory model showing memory utilization in the target platform of FIG. 2 during an unload operation.

FIGS. 3A, 3B, and 3C illustrate memory models showing memory utilization in the target platform 200 of FIG. 2 during load, overlay, and unload operations, respectively, in accordance with an exemplary embodiment of the present invention. As shown in FIG. 3A, when higher-level control processor 205 schedules an application to be executed by DSP 210, it triggers a control processor OMS function 309. This function gets the appropriate code and data load descriptors 303/304 (comprising Load Descriptor 1621) from the application's binary image ('BIM') in SDRAM 207. Each of these descriptors is essentially a list of DMA transactions. The control processor OMS 309 then sends the transaction information to the DMA controller 204. Upon completion of the DMA transfer, the "static" code and data images are in the DSP PRAM 211(*a*) and DRAM 212(*a*) static memory areas, and the application program is ready to be executed. DSP 215 is then started, and overlay management begins.

As shown in FIG. 3B, if DSP 215 issues a CALL to object X (see Table 1: Directives, in the appendix of this document), if X is a Static Program Object, it is already in the static memory area of program RAM 211(*a*). If X is a Static Program Object, the mapping phase 1230 has implemented the CALL directive as a direct call to X.

If, however, object X is an overlay, mapping phase 1230 has implemented the CALL as a 'trap' (i.e., a sequence of instructions that causes control to be transferred) to the underlying Object Management System (OMS) with X's Overlay Selector. The trap places the Overlay Selector into dual-port memory 208 along with a command code to fetch object X. The trap then interrupts control processor 205. The control processor interrupt handler (part of the control processor OMS) gets the command from dual-port memory 208 and runs a corresponding command handler, which is also part of the OMS.

Next, the command handler determines whether the CALLed object is already present in DSP local memory. This is accomplished by first retrieving the corresponding Overlay Selector from dual-port memory 208. The Overlay Selector is used to index into the Overlay Management Array 1322 in SDRAM 207 to point to the Object Management Descriptor (OMD) 1325 that manages object X. The command handler checks entry 1325(*a*) of the OMD to see if the object is "resident", meaning that it is already present in DSP PRAM 211(*b*). If so, the command handler responds to DSP 215 immediately via dual-port memory 208 and instructs the DSP to initiate execution of X. Otherwise, the handler gets DMA transaction information 1325(*b*) from OMD 1325 and immediately writes it to DMA controller 204, starting the transfer of object X into overlay memory area 211(*b*). The command handler then traverses Overlay List 1325(*c*) and marks as 'non-resident' all OMDs in OMA 1322 that correspond to objects overlaid by object X. When the transfer of X is complete, DMA controller 204 interrupts control processor 205, and the interrupt handler sends a signal, via dual-port memory 208, to DSP 215 to initiate execution of X.

As shown in FIG. 3C, when a program completes execution, it interrupts the control processor OMS 309, which unloads DSP static memory data area 212(*a*) into SDRAM 207 using the DMA transactions in data unload descriptor 306 (Unload Descriptor 1622). This unload is necessary in order to preserve the program's state between runs. Note that, if there is no program state, the data unload descriptor is empty, and no unload operation is performed.

Object Management System

Steps 110 through 160, as described in the previous sections, are performed on a 'per application' basis. This section presents a discussion of the Object Management System (OMS). The OMS is designed and implemented once per target platform, and serves to run ODE-annotated applications prepared as described in previous sections.

Figure 13:
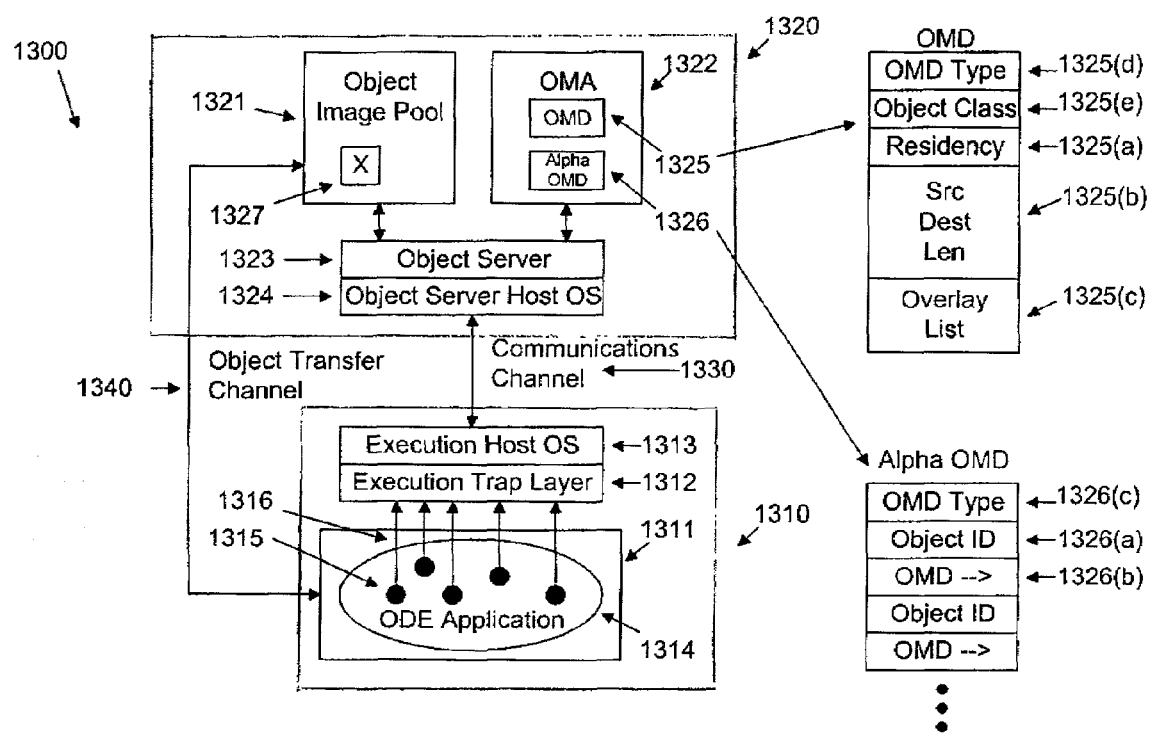
FIG. 13 illustrates the General Target Platform Model of the present method.

FIG. 13 illustrates the scope of OMS by presenting a Generalized Target Platform Model 1300. The model comprises the execution host 1310, which runs the application; an object server host 1320, which manages the transfer of program objects between the Object Image Pool 1321 in bulk memory and execution host fast memory 1311 via the object transfer channel 1340; and a communications channel 1330 through which the object server host and execution host communicate. Note that execution host 1310 and object server host 1320 can be separate processing entities or the same entity.

ODE application 1314 runs from execution host fast memory 1311. During execution, ODE directive occurrences 1315 within the application 'trap' 1316 to the execution trap layer 1312. A trap is a target-specific mechanism (e.g., software interrupt, subroutine call, etc.) through which ODE applications signal ODE directive occurrences to execution host 1310. The execution trap layer examines the event and either handles it locally (e.g., CALL X, where X is statically allocated) or communicates a request to Object Server 1323 (e.g., fetch X 1327, where X is identified by a unique, numeric Overlay Selector) via the execution host OS 1313-to-Communication Channel 1330-to-object server host OS 1324 target-specific mechanism. Object Server 1323 uses the Overlay Selector to index Overlay Management Array (OMA) 1322, comprising a plurality of Object Management Descriptors (OMDs) 1325, one for each overlay object in the application.

Object Management Descriptor design is part of the Design OMS Runtime activity 1210. Object Management Descriptor structure and contents vary depending on the specific target and allocation strategy. In an exemplary embodiment, all Object Management Descriptors 1325 contain the following five types of information:

(1) OMD segment 1325(*a*) indicates whether the requested object is 'resident' or 'not resident' in execution host fast memory 1311.

(2) OMD segment 1325(*b*) contains object transfer information (execution host fast memory source/destination address, Object Image Pool 1321 bulk memory destination/source address, and transfer length) necessary to transfer the object between bulk memory and execution host fast memory 1311 via the object transfer channel 1340.

(3) OMD segment 1325(*c*) contains a list of Object Management Descriptors 1325 and/or 1326 that represent objects overwritten by the requested object. This list drives an invalidation procedure in which all Object Management Descriptors on the list are marked 'non resident' when the object represented by the listing OMD is loaded to execution host fast memory 1311.

(4) OMD segment 1325(*d*) indicates the type of the Object Management Descriptor, 'normal' or 'alpha'.

(5) OMD segment 1325(*e*) indicates the Object Class (CODE, CDATA, VDATA) of the associated object.

To enable handle-based references of overlay DATA objects, Overlay Management Array 1322 also contains a plurality of Alpha OMDs 1326, each of which contains a plurality of associations of CODE Object IDs 1326(*a*) (see Table 3) with OMD pointers 1326(*b*). These associations allow resolution of a handle-based overlay data object exercise to the correct context-sensitive Object Management Descriptor 1325. For example, a DEF_HANDLE directive that references an overlay data object that can be exercised from multiple CODE objects (i.e., an overlay xDATA object that has multiple execution host memory 1311 load addresses) embeds the Alpha Overlay Selector 1222(*a*), which is used as an OMA index to an Alpha Object Management Descriptor 1326. The exercising CODE object's Object ID, embedded within ODE application 1314 and passed to Object Server 1323 during execution of trap 1316, is then used to resolve the correct context-sensitive Object Management Descriptor 1325.

For clarity, following is an exemplary mapping of the General Target Platform Model 1300 to the exemplary hardware environment (target platform 200) of FIG. 2. Object server host 1320 is Control Processor 205. Execution host 1310 is DSP 215. Object Image Pool 1321 and Overlay Management Array 1322 reside in bulk SDRAM 207. Object transfer channel 1340 is implemented by DMA 204. Execution host memory 1311 comprises the PRAM 211 and DRAM 212 entities, as Harvard architecture DSP 215 requires. Communication Channel 1330 is implemented by Dual-Port RAM 208, along with interrupt signaling.

Design OMS Runtime

The Design OMS Runtime activity 1210 is necessarily target specific. It is a manual activity that is performed once per platform, resulting in the ODE Trap Specification 1213 and OMS Runtime Specification 1214. The ODE Trap Specification 1213 presents the required behavior and manner of interfacing with Object Management System for each ODE directive. The OMS Runtime Specification 1214 presents the system requirements for implementing the Object Management System on a specific target platform.

In general, the Design OMS Runtime activity 1210 requires knowledge of the specific memory allocation strategy 1212, an examination of the target's hardware capabilities and performance characteristics 1211, and the General Target Platform Model 1300, all within the context of implementing an efficient mechanism for the real-time or near real-time transfer and management of ODE program objects as triggered by ODE exercise directives (BRANCH, CALL, RETURN, OPEN, CLOSE, GET, PUT) within executing applications. Exemplary memory allocation strategies are illustrated in FIGS. 8 and 9, described previously.

Generating the OMS Runtime Specification

The OMS Runtime Specification 1214 serves as the requirements document for the implementation of OMS on a specific target platform. The method of generating OMS Runtime Specification 1214 for a specific target platform is best illustrated with an example. FIG. 14 illustrates an exemplary application structure calling tree 1410, a construct well-known to practitioners in the art, exemplary memory allocation map 1420 and exemplary Data Dependency Database 1430. In addition, the discussion to follow assumes that the exemplary memory allocation models defined by the algorithms of FIGS. 8 and 9 are to be used for all applications that will run on the target platform 200.

Prior to running an application, all static code and data objects are loaded from Object Image Pool 1321 to execution host memory 1311 en masse via object transfer channel 1340. After the application terminates, all static VDATA objects are updated from execution host memory 1311 to Object Image Pool 1321 en masse via object transfer channel 1340. While the application is running, the mechanism described below is in effect.

With reference to the General Target Platform Model 1300, assume that the application starts execution in static CODE object X. When X CALLs static CODE object Y, the CALL directive implements an 'informational' trap 1316 to execution trap layer 1312. The present memory allocation model dictates that Object Server 1323 is kept informed of the program's entry into a new CODE object for use when managing overlay data objects (as discussed below). Therefore, in the exemplary Object Management System design presented here, all CALLs, BRANCHs and RETURNs, even those for static objects, are trapped.

The trap handler within execution trap layer 1312 communicates the 'informational' event to Object Server 1323 via Communication Channel 1330. Object Server 1323 notes that the application is now 'in' a new static CODE object by pushing a new 'context' on a 'context stack' (CS) maintained by the Object Server. Object Server 1323 marks the context as 'static' and signals execution trap layer 1312 to resume, which transfers control to Y's (known) address.

In the present example, assume that Y CALLs overlay W by name, e.g. 'CALL W'. This CALL causes a 'fetching' trap 1316. W's Overlay Selector (assigned by Selector Assignor 1223) is passed to Object Server 1323. Object Server 1323 'pushes' a new context on the CS and marks it with W's Overlay Selector. Object Server 1323 then indexes Object Management Array 1322 with the Overlay Selector to isolate W's Object Management Descriptor 1325. Object Management Descriptor entry 1325(d) shows the Object Management Descriptor to be 'normal', so Object Server 1323 checks W's Residency 1325(a) to see whether W is already 'resident' (as in a loop in Y in which W is repeatedly CALLed). If so, Object Server 1323 signals the application to continue in W. Otherwise, Object Server 1323 uses information 1325(b) to transfers W to its position in the overlay memory area of execution host memory 1311, marks all Object Management Descriptors in Overlay List 1325(c) (in this case a single OMD for overlay object Z) as 'non-resident', and signals the application to resume at W.

In the present example, assume that the CALL to W within Z is by a handle passed in to Z by X. This CALL causes a 'fetch by handle' trap 1316. A handle allows direct (by execution host 1310) determination of the following object attributes: (1) whether the object is static or an overlay; (2) if static, the object's load address; and (3) if an overlay, the object's Overlay Selector. The 'fetch by handle' trap examines the handle. If the object is static it causes an 'informational' trap, then transfers control to the object's address, as extracted from the handle. If the object is an overlay, the trap extracts the Overlay Selector and causes a 'fetching' trap to Object Server 1323, then transfers control to the address returned by Object Server 1323.

When W RETURNs, a 'return' trap causes Object Server 1323 to 'pop' its CS, which removes W's context. Object Server 1323 finds Z's context on the CS so it re-loads Z (via its Object Selector by indexing OMA 1322), marks it 'resident', invalidates all objects on Overlay List 1325(c) and signals the application to resume back in Z (via execution host 1310 return linkage), immediately after the CALL directive to W. When Z RETURNs, the 'return' trap causes Object Server 1323 to 'pop' the CS (Z's context), making Y's context active. Since Y's context is marked static, the Object Server knows it doesn't have to re-load anything. The program then resumes in Y after the CALL directive to Z.

With reference to FIG. 7, note that the Data Boxes for X and Y start at the same address 703 in data memory. Even though X and Y both use D4, D4 gets loaded to a different address depending on which CODE object is using it. Assume X is executing and OPENs D1 by name, e.g. 'OPEN D1'. Since D1 is static, the OPEN directive is implemented as a direct access of D1's address, without the need for a trap 1316. When D1 is later CLOSEd, no action is required since if static D1 is VDATA, it will be automatically unloaded when the application terminates.

In the present example, assume X OPENs D4 by name. Since D4 is an overlay, the OPEN is implemented as a 'fetching' trap 1316 that sends the Overlay Selector D4:X (i.e. D4 as exercised by X) to Object Server 1323. Object Server 1323 indexes Overlay Management Array 1322 to isolate D4:X's Object Management Descriptor 1325, checks Residency 1325(a), loads D4:X using information 1325(b) if not resident, marks the Object Management Descriptor 'resident' and invalidates all Object Management Descriptors in Overlay List 1325(c). Object Server 1323 discovers from the OMD entry Object Class 1525(e) that the object is data, so it logs D4:X's Overlay Selector to the current CS context and returns D4:X's address to the application, which continues.

Assume, in the present example, that X OPENs D2 by a handle. The OPEN causes a 'fetch by handle' trap 1316 which checks the handle to see if the exercised object (D2 in this case) is static or an overlay. If static, the object's address is extracted from the handle and used directly. If an overlay, as in this case, the object's Overlay Selector is extracted from the handle and a 'fetching' trap is issued and processed by Object Server 1323 as above. At this point, D2 and D4 are part of X's context, which is maintained on the CS by Object Server 1323.

In the present example, assume that X CLOSEs D4 by name. The CLOSE implements an 'update' trap 1316, passing Overlay Selector D4:X to Object Server 1323. Object Server 1323 selects D4:X's Object Management Descriptor and looks at its Object Class 1325(e). If VDATA, Object Server 1323 uses information 1325(b) to transfer the object from execution host memory 1311 to Object Image Pool 1321 via object transfer channel 1340. Object Server 1323 then removes D4:X's Overlay Selector from the current context.

Continuing with the present example, when X CALLs Y and the 'informational' trap occurs, Object Server 1323 looks at the current data context. If there are VDATA objects that are still OPEN, the Object Server indexes Overlay Management Array 1322 with their Overlay Selectors to unload and save them in order to clean out the overlay data area (CDATA objects are constant and cannot be changed so they do not have to be saved). Object Server 1323 then pushes an empty context onto the CS for use by Y (as described previously).

In the present example, assume that Y GETs the fourth minimum addressable unit (MAU) of D5, D5[4]. The GET causes a 'get' trap 1316, passing D5's handle, the object offset and the exercising CODE object's Object ID (see Table 3) to execution trap layer 1312. Execution trap layer 1312 examines the handle to see if the object is static or an overlay. If static, the operation can be performed 'locally', i.e., without Object Server 1323 involvement. In this case, the object's static base address is extracted from the handle, indexed by the offset and the requested data element is read and returned to the caller. If the object is an overlay, the Overlay Selector is extracted from the handle and a 'get' event is issued to Object Server 1323. Object Server 1323 indexes Overlay Management Array 1322 to identify D5's Object Management Descriptor. If the Object Management Descriptor is 'normal', Object Server 1323 looks at the object's Residency 1325(*a*). If 'resident', Object Server 1323 sends execution trap layer 1312 the object's base address using entry 1325(*b*) and flags a 'local' access, in which case execution trap layer 1312 accesses the requested MAU from the locally-resident copy of D5, as described above. If 'non-resident', Object Server 1323 uses information 1325(*b*) to locate D5's image in Object Image Pool 1321. Object Server 1323 indexes D5's image by the requested offset and reads the requested datum, which it then returns to execution trap layer 1312 which completes the 'get' trap.

If the Object Management Descriptor is 'alpha', Object Server uses the exercising Object ID to locate the correct OMD pointer 1326(*b*), then proceeds as above. Note that 'put', 'get vector', and 'put vector' traps are also required and work similarly, with the vector-versions using the services of Communication Channel 1330 and/or object transfer channel 1340, as appropriate, to transfer the data vector.

In the present example, assume that Y OPENs D4 by a handle it was passed by X. The OPEN causes a 'fetch by handle' trap 1316 which checks the handle to see if the exercised object is static or an overlay. If static, the address of the object is extracted from the handle and used directly. If an overlay, as in this case, the object's Overlay Selector is extracted from the handle and a 'fetching' trap is issued with an extra parameter, the Object ID of the exercising CODE object (Y in this case). Here, because D4 has multiple load addresses, the Overlay Selector is that of D4's Alpha OMD 1326. Object Server 1323 indexes Overlay Management Array 1322 and, examining OMA type 1326(*c*), finds that the Object Management Descriptor is for an Alpha Object. Object Server 1323 searches the Object IDs 1326(*a*) in the Object Management Descriptor for a match with the Object ID sent by the trap. When found, Object Server 1323 uses the corresponding OMA Pointer 1326(*b*) to access D4:Y's Object Management Descriptor 1325. The 'fetching' operation then proceeds as described previously.

Assume that, in the present example, Y then CLOSEs D4 by handle. The CLOSE causes an 'update by handle' trap 1316 which checks the handle to see if the exercised object is static or an overlay. If static, no further action is required since, if the object is VDATA, it will be updated when the application terminates. If the object is an overlay, as in this case, the object's Overlay Selector is extracted from the handle and an 'update' trap is issued with an extra parameter, the Object ID of the exercising CODE object (Y in this case). As indicated above, because D4 has multiple load addresses, the Overlay Selector is that of D4's Alpha OMD 1326. Object Server 1323 indexes Overlay Management Array 1322 and, examining OMA type 1326(*c*), finds that the Object Management Descriptor is for an Alpha Object. Object Server 1323 searches the Object IDs 1326(*a*) in the Object Management Descriptor for a match with the Object ID sent by the trap. When found, Object Server 1323 uses the corresponding OMA Pointer 1326(*b*) to access D4:Y's Object Management Descriptor 1325. The 'update' operation then proceeds as described previously.

When Y RETURNs, Y's context is 'popped' from the CS and X's data is restored by reloading all OPEN VDATA and CDATA objects.

The above description serves, in essence, as the OMS Runtime Specification 1214. With this specification and a description of the target platform, a target-specific OMS mechanism can be designed and implemented. Such an implementation serves as the 'Operating System' for applications using the ODE 'API.'

Generating the ODE Trap Specification

In order to generate the ODE trap specification, the language in the OMS Runtime Specification 1214 is examined to determine what traps are required and what they do. For example, the exemplary design presented above refers to 'informational', 'fetching', 'fetch by handle', 'update', 'update by handle' and 'return' traps, and describes what they do. The detailed OMS 'Operating System' implementation for the design described above determines the specific form a 'trap' takes for the specific target platform and how it is invoked (call, interrupt, etc.). It then remains to define the required behavior, in the context of the available traps, of each of the ODE directives.

An exemplary description best serves to illustrate the process of generating the ODE trap specification. The following description references the target platform of FIG. 2. In the present example, applications for DSP 215 are written in assembly language, a form well-known to practitioners in the art. Such code is machine processed by a programmed utility well-known as an assembler 1510, which converts the assembly language mnemonics into relocatable machine code. Such an assembler 1510 includes a well-known macro expansion capability, where the assembler expands programmer-defined symbols ('macros') into sequences of assembly instructions. Each macro takes zero or more parameters and, within each macro, decision processes (e.g., the well-known IF-THEN-ELSE construct) are available.

Linker 1520, a programmed utility well known to practitioners of the art, binds a plurality of individual assemblies, the well-known object files, as output from assembler 1510, into a single executable code entity 1530 by resolving address linkages between them. Linker 1520 also serves to locate groups of object code and data, well-known memory 'segments', to target-specific addresses based on physical memory address ranges. Such location specifications are communicated to Linker 1520 by the well-known technique of using a Linker Command File 1521, which is a target-specific description that drives the general-purpose Linker 1520.

Given the preceding scenario, an exemplary implementation of the ODE directives defines each one as a separate macro. Such macro symbols are used by application programmers to define program object boundaries (OBJ, ENDOBJ) and interdependencies (BRANCH, CALL, RETURN, OPEN, CLOSE, GET, PUT, DEF_HANDLE, GET_HANDLE). These macro definitions are packaged in an include file, a form well-known in the art, which each application source module includes during assembly. For the present exemplary implementation, such include file is identified as part of Mapping Database 1231, and is generated by mechanical means, Mapper 1232 (see Mapping section to follow). Following are descriptions of exemplary implementations of all ODE directives for the exemplary OMS design presented previously for the exemplary target platform of FIG. 2 and the exemplary memory allocation algorithms defined by FIGS. 8 and 9.

Handles

The term 'handle' is used frequently in the following exemplary directive implementation descriptions. As described previously, within ODE applications objects are exercised either by name or by handle. Because of the possibility of handle-based exercise, every object in an ODE application, whether static or overlay, preferably has a unique handle. For the exemplary target platform of FIG. 2, a static object's handle is defined to be its physical base address in DSP 215 local memory. An overlay object's handle is defined to be its Overlay Selector, offset by 0x8000. In the exemplary target platform of FIG. 2, a DSP 215 code or data physical address is always less than 0x8000 due to the small size of PRAM 211 and DRAM 212, so this convention provides a convenient indicator (sign bit) that allows traps to easily determine whether the object referenced by a handle is statically resident or requires Object Server 1323 involvement to acquire.

Directive Implementations

OBJ Macro

An exemplary OBJ macro implementation defines a public symbol, an entity well-known to practitioners in the art, to mark the start of a program object and make it 'visible'. The macro also defines a 'segment', with a name equal to the object's name, into which the object's contents (either code or data) will be put. Such segments are individually located by location directives in Linker Command File 1521, also generated by Mapper 1232 and comprising the remainder of Mapping Database 1231. An exemplary location directive is as follows:

LOCATE A AT 0x00010012

The 32-bit LOCATE address 0x00010012 ('0x' denoting hexadecimal') for object 'A' comprises two parts. The upper 16 bits contain the unique Object ID (hex "0001" in the above example) defined in Object List 421 (see also FIG. 11 and Table 3). The lower 16 bits ("0012", above) contain the base address of the object as defined in Allocation Database 1106.

This address format allows overlay objects, which may coexist within the same physical address space, to remain as unique objects within executable code 1530. Embedding the Object ID within executable code 1530 also allows the subsequent Object Image Generator 1540 to extract object images from their Object IDs. Since, in the present example, DSP 215 addressing is confined within 16 bits, the Object ID is truncated from opcode address fields during linking. However, executable code 1530 retains the full 32-bit address, allowing object identification.

For static data objects and overlay objects with only one location (i.e., objects which are not referenced by more than one CODE object), the LOCATE convention specified above applies. However, for overlay data objects that are multiply-referenced (i.e. overlay objects that are referenced from more than one CODE object and therefore have more than one allocation to overlay memory), the base address is always 0.

ENDOBJ

An exemplary ENDOBJ macro is implemented as a NULL implementation, an 'empty' macro.

DEF_HANDLE

An exemplary DEF_HANDLE macro implementation switches on all program object names, both code and data. This macro inserts the specified object's handle into the currently open segment at the current location counter, a concept well-known by practitioners in the art. If the object is static, its allocated target load address is used. If the object is an overlay and has only one target load address (all CODE objects and xDATA objects that are only exercised from one CODE object), its Overlay Selector, offset by 0x8000, is used. If the object is an xDATA object with multiple target load addresses, e.g. object D1 where CODE objects X and Y exercise it (D1:X and D1:Y), the Alpha Overlay Selector (e.g. 1222(*a*)), offset by 0x8000, is used.

GET_HANDLE

In an exemplary GET_HANDLE macro implementation, the objectName (see APPENDIX, Table 1) parameter can be either a pointer or an object name. If a pointer is specified, an instruction sequence is coded in which the handle at the memory location pointed to by the objectName parameter is read and stored in handleContainer (see APPENDIX, Table 1). Otherwise, the macro switches on all program objects in the application, as defined in Object List 421. If a static object name is specified, the target load address is loaded into handleContainer. If an overlay object name with only one target load address (all CODE objects and xDATA objects exercised from only one CODE object) is specified, the object's Overlay Selector, offset by 0x8000, is loaded into handleContainer. If an overlay object name with multiple target load addresses (xDATA objects exercised from more than one CODE object) is specified, the Alpha Overlay Selector (e.g. 1222(*a*)), offset by 0x8000, is loaded into handleContainer.

BRANCH

The exercise target of an exemplary BRANCH macro implementation can be specified either by name or by handle. The two cases are coded differently. For name-based references, the exemplary BRANCH macro is implemented as a switch statement, switching on all CODE object names, as contained within Object List 421. Allocation Database 1106 identifies each code object as either static or dynamic, and includes the object's allocation base address. Static object exercises implement 'informational' traps followed by direct 'branch' instructions to the object's load address. Overlay object exercises implement an OMS 'fetching' trap sequence, specifying the Overlay Selector found in Overlay Selector Database 1221, followed by a direct 'branch' instruction. Handle-based object exercises implement an OMS 'fetch by handle' trap sequence, specifying the handle, followed by an 'indirect branch' instruction. An 'indirect branch' instruction is a branch to the address returned by Object Server 1323 (for handle-based exercises, the address of the exercised object is resolvable and known only at run-time).

CALL

The exercise target of an exemplary BRANCH macro implementation can be specified either by name or by handle. The two cases are coded differently. For name-based references, the exemplary CALL macro is implemented as a switch statement, switching on all CODE object names, as contained within Object List 421. Allocation Database 1106 identifies each code object as either static or dynamic, and includes the object's allocation base address. Static object exercises implement 'informational' traps followed by direct 'call' instructions to the object's load address. Overlay object exercises implement an OMS 'fetching' trap sequence, specifying the Overlay Selector found in the Overlay Selector Database 1221, followed by a direct 'call' instruction.

Handle-based object exercises implement an OMS 'fetch by handle' trap sequence, specifying the handle, followed by an 'indirect call' instruction. An 'indirect call' instruction is a call to the address returned by Object Server 1323 (for handle-based exercises, the address of the exercised object is resolvable and known only at run-time).

RETURN

An exemplary RETURN macro implementation codes a 'return' trap, then codes a native return instruction, transferring control to the 'next level up' via the program counter stack, an entity well-known to practitioners in the art, of DSP 215.

OPEN

The exercise target of an exemplary OPEN macro implementation can be specified either by name or by handle. The two cases are coded differently. For name-based references, the exemplary OPEN macro is implemented as a switch statement, switching on all object names, as contained within Object List 421. Allocation Database 1106 identifies each object as either static or dynamic, and includes the object's allocation base address. If the target object is static, pointerContainer is loaded directly with the object's load address. If the target object is an overlay object, a 'fetching' trap sequence is coded with the object's context-sensitive Overlay Selector. After return, pointerContainer is loaded with the object's load address.

For handle-based references, the address of the object is not known and a 'fetch by handle' trap sequence is coded, providing the handle and the Object ID of the exercising CODE object (known at assembly-time). After return, pointerContainer (see APPENDIX, Table 1) is loaded with the object address returned by Object Server 1323.

CLOSE

The CLOSE macro is only implemented for overlay VDATA objects since they are the only ones that require dynamic writeback to Object Server 1323. Static VDATA objects are written back when the application terminates. CODE and CDATA objects, since they are constant, do not need writeback. The target of a CLOSE can be specified either by name or by handle.

For name-based references, the exemplary CLOSE macro is implemented as a switch statement, switching on all VDATA object names, as contained within Object List 421. Allocation Database 1106 identifies each code object as either static or dynamic, and includes the object's allocation base address. If the target object is a VDATA overlay, an 'update' trap sequence is coded with the object's context-sensitive Overlay Selector. For handle-based references, an 'update by handle' trap sequence is coded, providing the handle and the Object ID of the exercising object.

GET

In an exemplary GET macro implementation, the target object can be specified by name or by handle. In addition, a single word can be returned to a register or one or more words can be returned to a block specified by a pointer. Single reads with a register destination use the 'get' trap. Destinations marked by a pointer use the 'get vector' trap. If the object is specified by name, a switch on all xDATA objects is implemented. For all objects, a 'get' or 'get vector' trap is coded with the specified macro parameters and the handle of the object, either the object's address (static objects) or the object's Overlay Selector offset by 0x8000 (overlay objects). Note that if an overlay object has multiple load addresses, the Overlay Selector of the object's Alpha OMD is used. If the target object is specified by handle, the handle and calling parameters are passed to a 'get' or 'get vector' trap.

PUT

In an exemplary PUT macro implementation, the target object can be specified by name or by handle. In addition, a single word can be written from a register or immediate value, concepts well-known to practitioners in the art, or one or more words can be written from a block specified by a pointer. Single writes with a register or immediate source use the 'put' trap. Sources marked by a pointer use the 'put vector' trap.

If the object is specified by name, a switch on all VDATA objects is implemented. For all objects, a 'put' or 'put vector' trap is coded with the specified macro parameters and the handle of the object, either the object's address (static objects) or the object's Overlay Selector offset by 0x8000 (overlay objects). Note that if an overlay object has multiple load addresses, the Overlay Selector of the object's Alpha OMD is used. If the target object is specified by handle, the handle and calling parameters are passed to a 'put' or 'put vector' trap.

Although the foregoing description sets forth exemplary embodiments of the invention, the scope of the invention is not limited to these specific embodiments. Modification may be made to the specific form and design of the invention without departing from its spirit and scope as expressed in the following claims. It is to be noted that the specific formats and contents of the files, and the steps described for performing structure extraction, memory allocation, and target mapping described herein, are merely exemplary, and the method of the present invention is operative with other specific formats and steps in accordance with the method disclosed herein.

What is claimed is:

1. A method for executing a computer program having source code on a target computer platform having a memory, the method comprising the steps of:
    defining a plurality of program objects for the computer program;
    placing a first plurality of directives in the source code to divide the computer program into the program objects, whereby an annotated computer program is produced;
    processing the annotated computer program to generate a description for each of the program objects;
    allocating the program objects to fixed locations in the memory of the target computer platform;
    porting the annotated computer program to the target computer platform;
    generating an executable image of the annotated computer program, wherein the executable image is configured for execution on the target computer platform; and
    executing the executable image on the target computer platform.

2. The method according to claim 1, wherein in the step of defining a plurality of program objects, the program objects comprise executable code, constant data, and volatile data.

3. The method according to claim 1 further comprising the step of estimating a typical usage for each of the program objects.

4. The method according to claim 1 further comprising the step of designating each of the program objects as one of (a) a static program object and (b) an overlay program object.

5. The method according to claim 1, wherein the step of porting the annotated computer program further comprises binding each of the directives to an object management system of the target computer platform.

6. The method according to claim 1 further comprising the step of placing a second plurality of directives in the source code to indicate linkages between program objects.

7. The method according to claim 1 further comprising the step of:
    identifying a plurality of application boundaries in the source code, wherein each application boundary identifies a transition point between two program objects in the source code; and
    wherein the step of placing a first plurality of directives further comprises placing the first plurality of directives in the source code at the application boundaries.

8. The method according to claim 1, wherein in the step of defining a plurality of program objects, each of the program objects has a unique name.

9. A computer program product embodied on a first computer for facilitating the execution of a computer program having source code on a second computer having a memory, the computer program product comprising:
    a compiler code segment comprising computer readable program code configured to cause the first computer to perform the steps of:
        defining a plurality of program objects for the computer program; and
        placing a first plurality of directives in the source code to divide the computer program into the program objects, whereby an annotated computer program is produced;
    an extraction code segment comprising computer readable program code configured to cause the first computer to process the annotated computer program to generate a description for each of the program objects;
    an object allocation code segment comprising computer readable program code configured to cause the first computer to allocate the program objects to fixed locations in the memory of the second computer;
    a porting code segment comprising computer readable program code configured to cause the first computer to port the annotated computer program to the second computer; and
    a merging code segment comprising computer readable program code configured to cause the first computer to generate an executable image of the annotated computer program, wherein the executable image is configured for execution on the second computer.

10. The computer program product of claim 9 further comprising a test code segment comprising computer readable program code configured to cause the first computer to estimate a typical usage for each of the program objects.

11. A system for optimizing source code for execution on a target computer platform having a memory, comprising:
    a first module defining a plurality of program objects of the source code;
    a second module placing a first plurality of directives in the source code to divide the source code into the program objects, whereby an annotated computer program is produced;
    a third module processing the annotated computer program to generate a description for each of the program objects;
    a fourth module allocating the program objects to fixed locations in the memory of the target computer platform;
    a fifth module porting the annotated computer program to the target computer platform;
    a compiler compiling and linking the annotated computer program to generate an executable image, wherein the executable image is configured for execution on the target computer platform; and
    a processor executing the executable image on the target computer platform.

12. The system of claim 11, wherein the first module defining the plurality of program objects further defines executable code objects, constant data objects, and volatile data objects.

13. The system of claim 11 further comprising a sixth module stimulating each program object with a test vector to determine a usage for each program object.

14. The system of claim 11 further comprising a seventh module designating each of the program objects as one of (a) a program object that is resident for the duration of the application and (b) a program object that is paged as needed.

15. The system of claim 11, wherein the fifth module binds each of the directives to an object management system of the target computer platform.

16. The system of claim 11 wherein the second module places a second plurality of directives in the source code to indicate linkages between program objects.

17. The system of claim 11 further comprising:
    an eighth module identifying a plurality of application boundaries in the source code, wherein each application boundary identifies a transition point between two program objects in the source code; and
    wherein the second module places the first plurality of directives in the source code at the application boundaries.

18. The system of claim 11, wherein the first module ensures that each of the program objects has a unique name.

19. The system of claim 11 wherein the second module selects the first plurality of directives form the group comprising a branch, a call, a close, a def_handle, an endobj, an entry, a get, a get_handle, an obj, an open, a put, and a return.

* * * * *